US010334456B2

(12) United States Patent
Yang et al.

(10) Patent No.: US 10,334,456 B2
(45) Date of Patent: Jun. 25, 2019

(54) OPTIMIZING CELLULAR NETWORKS USING DEEP LEARNING

(71) Applicant: Futurewei Technologies, Inc., Plano, TX (US)

(72) Inventors: Jin Yang, Bridgewater, NJ (US); Yongxi Tan, Hillsborough, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 153 days.

(21) Appl. No.: 15/642,563

(22) Filed: Jul. 6, 2017

(65) Prior Publication Data
US 2019/0014487 A1    Jan. 10, 2019

(51) Int. Cl.
G06N 3/04     (2006.01)
G06N 3/08     (2006.01)
H04W 16/32    (2009.01)
H04W 24/02    (2009.01)

(52) U.S. Cl.
CPC .............. H04W 24/02 (2013.01); G06N 3/04 (2013.01); G06N 3/08 (2013.01); H04W 16/32 (2013.01)

(58) Field of Classification Search
CPC .................................. H04W 24/02; G06N 3/04
USPC ........................................................ 370/252
See application file for complete search history.

(56) References Cited

U.S. PATENT DOCUMENTS

| 2008/0318643 | A1  | 12/2008 | Manna et al. |
| 2011/0128997 | A1* | 6/2011  | da Silva ............ H04L 1/02 375/147 |
| 2012/0225657 | A1  | 9/2012  | Watanabe et al. |
| 2014/0094181 | A1  | 4/2014  | Kakinada et al. |

FOREIGN PATENT DOCUMENTS

| CN | 103458473 A    | 12/2013 |
| WO | 2016184141 A1  | 11/2016 |

OTHER PUBLICATIONS

Cui, Huayang, Link Prediction on Evolving Data Using Tensor-based Common Neighbor (Year: 2012).*
International Search Report, dated Sep. 21, 2018, in International Patent Application No. PCT/CN2018/094629, 9 pages.

* cited by examiner

Primary Examiner — Peter G Solinsky
(74) Attorney, Agent, or Firm — Vierra Magen Marcus LLP

(57) ABSTRACT

The present technology provides a new approach to optimizing wireless networks, including the coverage and capacity of cellular networks, using deep learning. The proposed method involves generating a group of cells comprising a cell identified as underperforming and one or more neighboring cells, ranking the one or more neighboring cells based on one or more relationship parameters between the underperforming cell and the one or more neighboring cells, and generating a multi-dimensional multi-channel state tensor for the group of cells based on the ranking of the one or more neighboring cells. This approach to cellular network optimization improves the coverage and capacity of cellular networks using a process that is faster, more accurate, less costly, and more robust.

20 Claims, 16 Drawing Sheets

*FIG. 14*

|     | C11 | C3  | C2  | C6 | C13 | C9 | C10 | C8 | C12 | C5 | C7 | C14 | C15 |
| --- | --- | --- | --- | --- | --- | --- | --- | --- | --- | --- | --- | --- | --- |
| C11 | 100 | 95  | 49  | 78 | 37  | 28 | 54  | 91 | 83  | 49 | 16 | 40  | 52  |
| C3  | 95  | 100 | 56  | 91 | 52  | 60 | 40  | 42 | 77  | 14 | 69 | 49  | 38  |
| C2  | 49  | 56  | 100 | 27 | 55  | ...|     |    |     |    |    |     |     |
| C6  |     |     |     |    |     |    |     |    |     |    |    |     |     |
| C13 |     |     |     |    |     |    |     |    |     |    |    |     |     |
| C9  |     |     |     |    |     |    |     |    |     |    |    |     |     |
| C10 |     |     |     |    |     |    |     |    |     |    |    |     |     |
| C8  |     |     |     |    |     |    |     |    |     |    |    |     |     |
| C12 |     |     |     |    |     |    |     |    |     |    |    |     |     |
| C5  |     |     |     |    |     |    |     |    |     |    |    |     |     |
| C7  |     |     |     |    |     |    |     |    |     |    |    |     |     |
| C14 |     |     |     |    |     |    |     |    |     |    |    |     |     |
| C15 |     |     |     |    |     |    |     |    |     |    |    |     |     |

610

OPTIMIZING CELLULAR NETWORKS USING DEEP LEARNING

CROSS-REFERENCE

This application is cross-referenced to U.S. application Ser. No. 15/643,266, entitled "System And Method For Deep Learning And Wireless Network Optimization Using Deep Learning", which application is filed on the same day herewith and which application is incorporated by reference herein in its entirety.

FIELD

The disclosure relates to optimizing cellular networks and other types of wireless networks using deep learning and, in particular, relates to arranging multiple channels of data about groups of neighboring cells into a multi-dimensional state tensor to be used as an input to a deep neural network.

BACKGROUND

A cellular network, or mobile network, is a wireless communication network that may be divided into one or more geographical regions known as cells, that may be communicatively interconnected via one or more fixed location transceivers known as base stations. Through an arrangement of cells and base stations, a cellular network may provide wireless communication coverage over a large geographical area and enable wireless communication devices to communicate with each other anywhere in the network, potentially over long distances. Modern cellular networks are becoming larger and more complex, as the industry migrates towards densely-deployed networks that include large numbers of highly concentrated cells capable of providing near ubiquitous coverage. As cellular networks grow in size and complexity, optimizing their coverage and capacity becomes increasingly challenging. For example, an increase in the number of cells results in an exponential increase in the number of interactions and potential interference between neighboring cells. Because of interference, changing the settings of one cell to improve its coverage and capacity may potentially decrease the coverage and capacity of that cell's neighbors as well as the coverage and capacity of the overall network.

One conventional method that has been used to address these challenges is to construct a virtual model of the cellular network so that network parameters may be adjusted and optimized in a virtual environment. This approach, however, has several drawbacks. First, the optimization process can be slow, often requiring days or weeks for the model to be built and for the simulated network parameters to be optimized. Second, the process can be costly, since it requires drive testing and knowing where user devices are located geographically. Third, solutions produced from the simulated environments can be inaccurate due to inaccurate representations of engineering parameters, such as the mechanical tilt on the antennae of a base station.

A second conventional approach to optimizing the coverage and capacity of a cellular network is to optimize network parameters iteratively by making small step adjustments and gathering real-world feedback on the effects of those adjustments on a real network until an optimal solution is found. This iterative approach can also be slow, usually taking three to five or more iterations and several days to optimize the network. In addition, having to make many adjustments to a real network can risk some parts of the network losing coverage because of those adjustments. Moreover, even when an optimal solution is found for one cellular network, the solution cannot be applied to a different cellular network. Rather, optimization for a new cellular network would require starting the iterative process all over again from scratch.

SUMMARY

According to one aspect of the present disclosure, there is provided a computer-implemented method for optimizing a cellular network having a plurality of cells that includes: selecting a group of cells comprising a cell identified as underperforming and one or more neighboring cells, ranking the one or more neighboring cells based on one or more relationship parameters between the underperforming cell and the one or more neighboring cells, generating a state tensor for the group of cells based on the ranking of the one or more neighboring cells, the state tensor reflecting operational communication conditions within the group of cells in the cellular network, processing the state tensor to produce one or more recommendations for adjusting one or more parameters of the cellular network, and adjusting the one or more parameters of the cellular network based on the one or more recommendations.

Optionally, in any of the preceding aspects, the processing of the state tensor to produce one or more recommendations for adjusting one or more parameters of the cellular network includes: submitting the state tensor as input into a deep neural network, and producing one or more recommendations, using the deep neural network, for adjusting one or more parameters of the cellular network.

Optionally, in any of the preceding aspects, the cell is identified as underperforming when one or more cell performance measurements exceed one or more thresholds.

Optionally, in any of the preceding aspects, the one or more cell performance measurements comprise an objective function value that is calculated based on a relationship between signal power and signal quality.

Optionally, in any of the preceding aspects, the one or more relationship parameters comprise an interference level between the underperforming cell and the one or more neighboring cells.

Optionally, in any of the preceding aspects, the interference level is a value that is averaged over a period of time.

Optionally, in any of the preceding aspects, the generating a state tensor for the group of cells based on the ranking of the one or more neighboring cells further includes: selecting a size for a base grid, constructing a base grid of the selected size, wherein cells in the group of cells are placed in a position on both a horizontal axis and a vertical axis of the base grid, extracting multiple channels of information for one or more pairs of cells, each of the one or more pairs of cells comprising a cell from the horizontal axis and a cell from the vertical axis in the base grid, and constructing the state tensor based on the base grid and the extracted multiple channels of information.

Optionally, in any of the preceding aspects, the constructing a base grid comprises: placing the underperforming cell in the base grid at the center of the horizontal axis and the vertical axis, and arranging the one or more neighboring cells in the base grid such that higher ranking neighboring cells are placed closer to the underperforming cell on the horizontal axis and the vertical axis.

Optionally, in any of the preceding aspects, the deep neural network is a convolutional neural network.

Optionally, in any of the preceding aspects, the producing one or more recommendations, using the deep neural network, for adjusting cell parameters of the cellular network includes: applying the solution to the cellular network, and determining whether to accept the solution based on an impact of the one or more recommendations on the cellular network, wherein the impact is measured by a change in an overall coverage and capacity of the cellular network.

Optionally, in any of the preceding aspects, the computer-implemented method further includes: rejecting the one or more recommendations in response to determining that the impact of the one or more recommendations negatively affects the overall coverage and capacity of the cellular network, accepting the one or more recommendations in response to determining that the impact of the one or more recommendations positively affects the overall coverage and capacity of the cellular network, and updating the deep neural network based on whether the one or more recommendations were accepted.

The computer-implemented method of claim 1, wherein the group of cells and one or more additional groups of cells are each assigned a priority.

Optionally, in any of the preceding aspects, the priorities of the group of cells and one or more additional group of cells is calculated based on one or more of the severity, preference, weight, and neighbor relationships associated with the underperforming cell in the group of cells.

Optionally, in any of the preceding aspects, the group of cells and the one or more additional groups of cells are optimized in an order of a highest to a lowest priority.

Optionally, in any of the preceding aspects, the group of cells and at least one of the one or more additional groups of cells having the highest priority are optimized in parallel.

According to another aspect of the present disclosure, there is provided a cellular network optimization device that includes: a non-transitory memory storage comprising instructions, and one or more processors in communication with the memory, wherein the one or more processors are configured to execute the instructions to: select a group of cells comprising a cell identified as underperforming and one or more neighboring cells, rank the one or more neighboring cells based on one or more relationship parameters between the underperforming cell and the one or more neighboring cells, generate a state tensor for the group of cells based on the ranking of the one or more neighboring cells, the state tensor reflecting operational communication conditions within the group of cells in the cellular network, process the state tensor to produce one or more recommendations for adjusting one or more parameters of the cellular network, and adjust the one or more parameters of the cellular network based on the one or more recommendations.

Optionally, in any of the preceding aspects, the one or more processors are further configured to execute the instructions to: submit the state tensor as input into a deep neural network, and produce one or more recommendations, using the deep neural network, for adjusting one or more parameters of the cellular network.

Optionally, in any of the preceding aspects, the generate a state tensor for the group of cells based on the ranking of the one or more neighboring cells comprises: select a size for a base grid, construct a base grid of the selected size, wherein cells in the group of cells are placed in a position on both a horizontal axis and a vertical axis of the base grid, extract multiple channels of information for one or more pairs of cells, each of the one or more pairs of cells comprising a cell from the horizontal axis and a cell from the vertical axis in the base grid, and construct the state tensor based on the base grid and the extracted multiple channels of information.

Optionally, in any of the preceding aspects, the construct a base grid comprises: place the underperforming cell in the base grid at the center of the horizontal axis and the vertical axis, and arrange the one or more neighboring cells in the base grid such that higher ranking neighboring cells are placed closer to the underperforming cell on the horizontal axis and the vertical axis.

According to another aspect of the present disclosure, there is provided a non-transitory computer-readable medium storing computer instructions for optimizing a cellular network having one or more cells that when executed by one or more processors, cause the one or more processors to perform the steps of: select a group of cells comprising a cell identified as underperforming and one or more neighboring cells, rank the one or more neighboring cells based on one or more relationship parameters between the underperforming cell and the one or more neighboring cells, generate a state tensor for the group of cells based on the ranking of the one or more neighboring cells, the state tensor reflecting operational communication conditions within the group of cells in the cellular network, process the state tensor to produce one or more recommendations for adjusting one or more parameters of the cellular network, and adjust the one or more parameters of the cellular network based on the one or more recommendations.

BRIEF DESCRIPTION OF THE DRAWINGS

FIGS. 12-14 are illustrations of state planes according to embodiments of the present technology.

DETAILED DESCRIPTION

Figure 1:
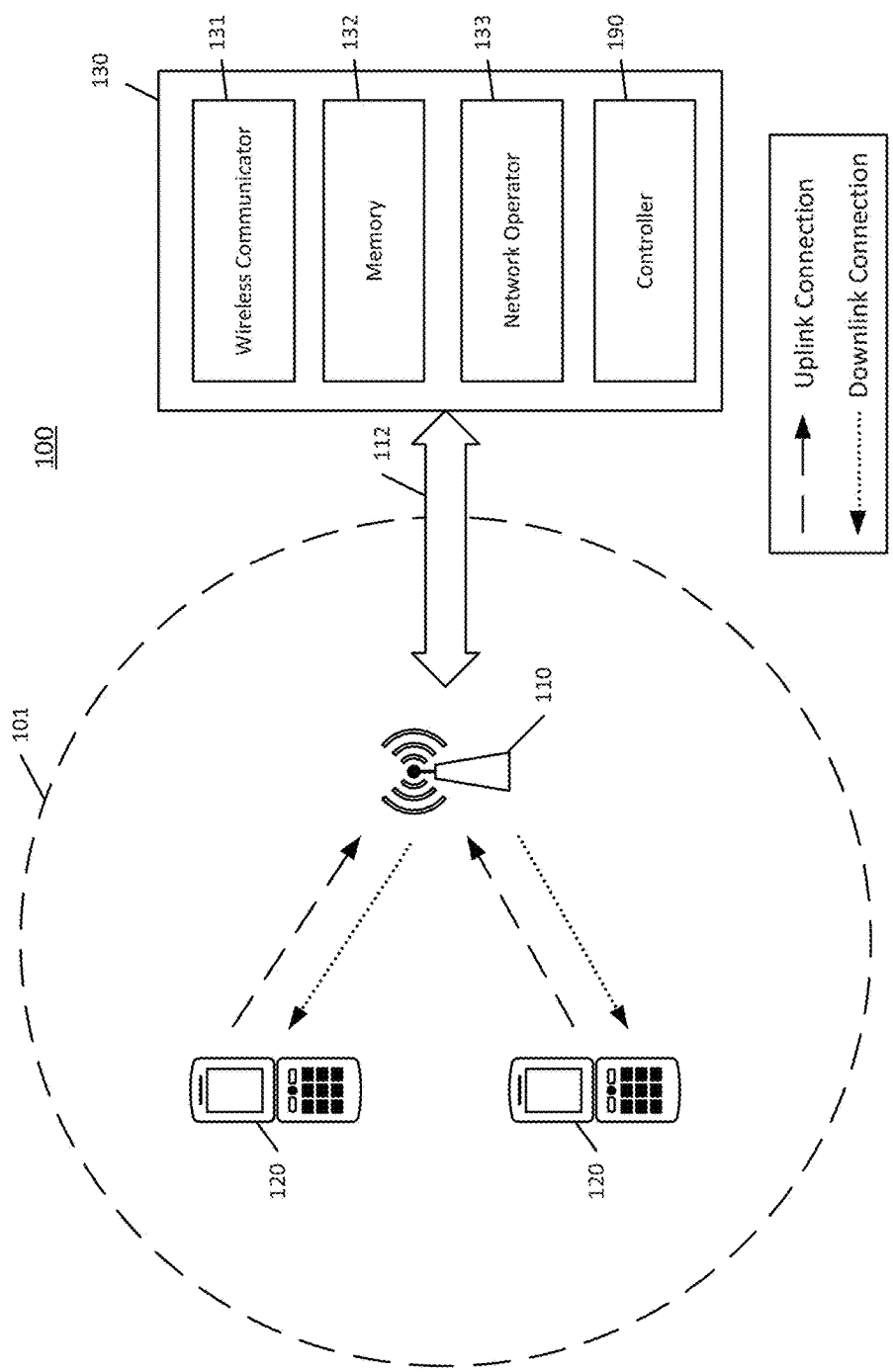
FIG. 1 illustrates a cellular network in which the present technology may be implemented.

The present technology, roughly described, provides a framework for optimizing wireless networks, such as cellular networks, using deep learning and includes a mechanism for structuring the input data to a deep neural network (DNN). In various embodiments, the present technology identifies underperforming cells in a cellular network and selects one or more groups of cells associated with the underperforming cells to be optimized, each group containing an underperforming cell and its neighbor cells. For each group of cells to be optimized, a multi-dimensional state tensor is constructed to represent the state of the underperforming cell and its neighbor cells according to relevant information and inter-cell relationships. The multi-dimensional state tensor is arranged such that the underperforming cell is positioned at the center of the tensor and the neighbor cells having stronger relationships to the underperforming cell are positioned closer to the underperforming cell. These multi-dimensional state tensors are then used as inputs to a DNN to generate solutions. The solutions are in turn used to adjust the cell parameters of cells in the selected group of cells to optimize the cellular network. The solutions may be adopted when they improve network performance relative to using the currently used or otherwise best available solution. The adoption or rejection of the solutions may then be fed back to the DNN to improve its operation.

The present technology provides at least the following technical advantages. Self-Organizing Networks (SONs), particularly those making use of deep learning, may be used to automatically optimize cellular networks. Using deep learning, the present technology uses mobile reports from user devices as input data. Although engineering parameters and geolocational information from user devices can also be considered under the present approach, they are not necessary for a deep neural network to generate an optimization solution. Consequently, the present technology can find optimization solutions for a cellular network faster than conventional systems since it does not need to conduct on-site verification of engineering parameters or drive testing by an army of optimization engineers.

Additionally, the use of a deep neural network requires minimal assumptions about the target network and the input data, and therefore allows the deep neural network to adapt to unforeseen scenarios or situations having dynamic and complex network interactions that would be difficult to model manually. Moreover, because of deep neural networks' ability to adapt to new situations, a deep neural network that has been trained from data at one geographic location would be able to optimize cellular networks at a new geographic location without having to be completely retrained from scratch.

As a further advantage, deep neural networks can learn from prior experiences in applying solutions to real networks (e.g. based on positive or negative gains in performance or cost, or based on a new state tensor of a network once a solution has been applied to the network, etc.). A deep neural network improves in both speed and accuracy over time as it collects data and feedback from cellular networks in a variety of locations. Moreover, deep neural networks can be trained from a variety of simulated and real scenarios. Once they are sufficient trained, they can generate an optimal solution for a new real-world scenario in a single pass, without having to make multiple iterative adjustments.

The description herein is directed to using a convolutional neural network (CNN) to illustrate one embodiment of the present technology. However, it is understood that alternative embodiments of the present technology may use other neural network configurations and deep learning methods. These other neural network configurations and deep learning methods include, but are not limited to, the use of recurrent neural networks, Deep Boltzmann machines, and deep belief networks.

Embodiments of the present technology can also be applied to many other areas of wireless network optimization, such as Automatic Neighbor Relation (ANR), Automated Configuration of Physical Cell Identity (ACPCI), Mobility Robustness Optimization (MRO), Mobility Load Balancing (MLB), Coverage and Capacity Optimization (CCO), Energy Savings, Interference Reduction, RACH optimization, Inter-cell interference coordination (ICIC), Calibration of Inaccurate Engineering Parameters, Cell labeling, Identification of Cells or Area to be optimized or adjusted, Cell Outage Detection (COD), Cell Outage Compensation (COC), and others. In addition, although embodiments of the present technology are discussed with respect to a cellular network 100, it is understood that a wide variety of different networks and components may be employed in other embodiments, including other types of wireless networks such as a Wi-Fi network.

FIG. 1 is a diagram of an exemplary cellular network 100 for communicating data in which the present technology may be implemented. In one embodiment, the cellular network 100 includes a base station 110 having a wireless coverage area 101, a plurality of mobile devices 120, and a server 130.

A base station 110, also referred to herein as BS 110, is any component (or collection of components) configured to provide wireless access in a wireless network. In the context of wireless networks more generally, the BS 110 may also be referred to as an access point (AP), which includes any component (or collection of components) configured to provide wireless access in a wireless network, such as an evolved NodeB (enB), a macro-cell, a femtocell, or a Wi-Fi access point. In one embodiment, a BS 110 may include a set of electronic communications equipment that facilitate wireless communication between mobile devices 120 and a cellular network 100. The electronic communications equipment placed at BS 110 may include antennae, one or more transceivers, digital signal processors, control electronics, a GPS receiver, primary and backup electrical power sources, sheltering, and other equipment for sending and receiving information to and from mobile devices. A BS 110 may further have engineering parameters, including, but not limited to, a height of the radio tower, a mechanical tilt of its antennae, and an electronic tilt. Some of these parameters may be fixed while others are adjustable either mechanically or electronically.

A mobile device 120 is any component (or collection of components) capable of establishing a wireless connection with a BS 110. A mobile device may also be referred to as a user equipment (UE), a mobile station (STA), a relay, or a device engaging in machine type communication, as used in the art. Each mobile device 120 may produce mobile reports (MRs) regarding network performance, including measures such as reference signal received power (RSRP) and reference signal received quality (RSRQ).

ABS 110 may provide wireless communication coverage to mobile devices 120 such that each BS 110 may be communicatively linked to zero or more mobile devices 120 up to a certain capacity. As shown, the BS 110 establishes uplink (dashed line) and/or downlink (dotted line) connections with the mobile devices 120, which serve to carry data from the mobile devices 120 to the BS 110 and vice-versa. Data carried over the uplink/downlink connections may include data communicated between the mobile devices 120, as well as data communicated to/from the server 130. BS 110 may provide wireless access in accordance with one or more wireless communication protocols, e.g., long term evolution (LTE), LTE advanced (LTE-A), High Speed Packet Access (HSPA), and Wi-Fi 802.11a/b/g/n/ac.

Figure 2:
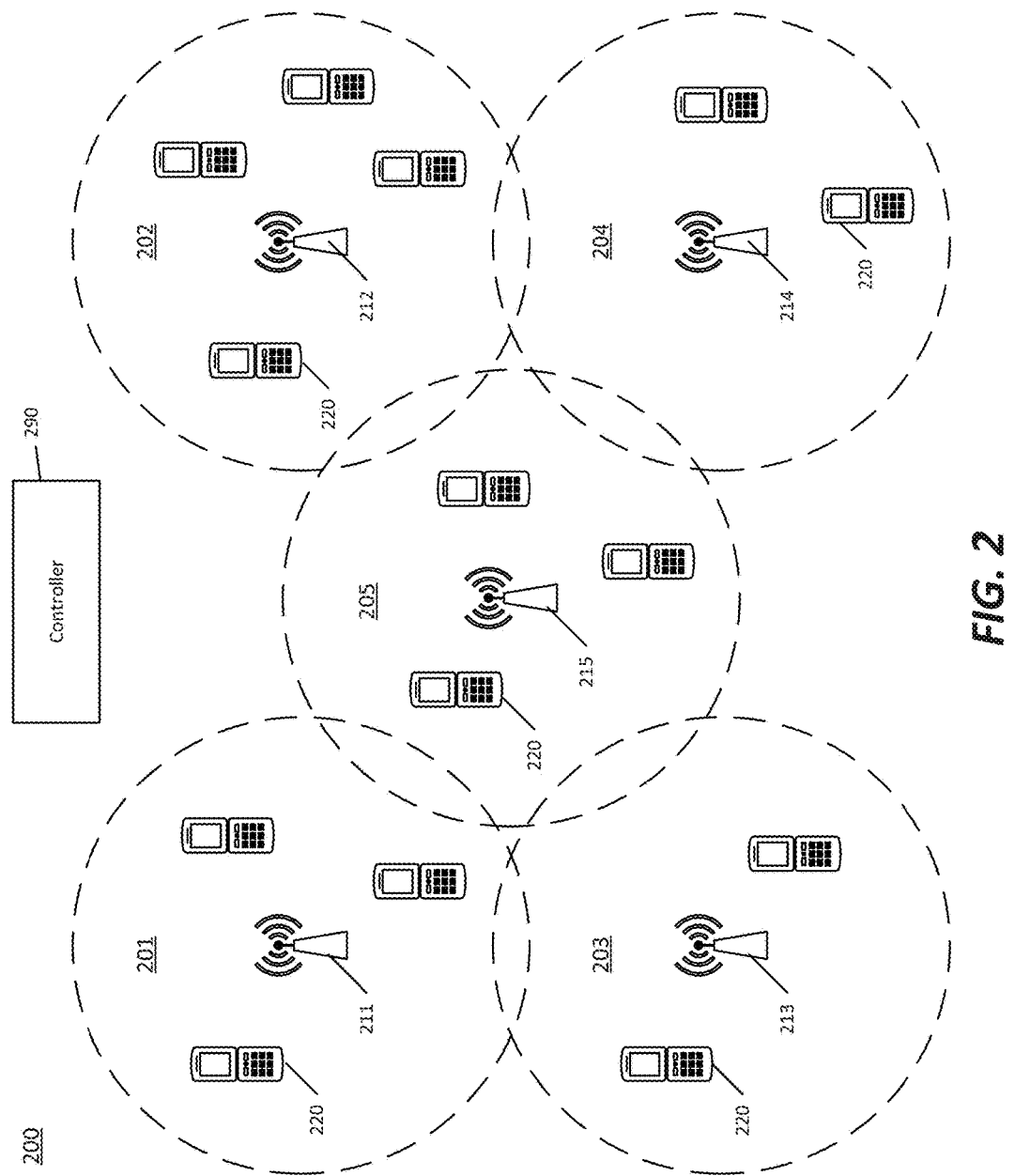
FIG. 2 illustrates a network of base stations having overlapping coverage areas.

In alternative embodiments, such as what is depicted in FIG. 2, the cellular network 100 may include a plurality of BSs 110 communicatively connected to each other to form a network of BSs 110. Each BS may have its own coverage area 101. By connecting mobile devices 120 from different coverage areas 101 to a network of BSs 110, the mobile devices 120 are in effect also communicatively linked to each other and can transmit to and receive information from each other through the network of BSs 110.

The server 130 includes, for example, a wireless communicator 131, memory 132, network operation 133 and controller 190. The wireless communicator 131 transmits outbound information away from the server 130 and receives inbound information coming into the server 130, as depicted by arrow 112. This includes information sent to and from the BS 110 or a network of BSs 110 in alternative embodiments. In one embodiment, the server 130 is communicatively linked with the BS 110 via a direct communicative link. In alternative embodiments involving a network of BSs 110, the server may be directly linked to one of the BSs 110 that is geographically nearest to the server's 130 location. In another embodiment, each BS 110 in a network of BSs may have a direct communicative link to the server 130. It is understood that other configurations of network connections are possible in alternative embodiments of the present technology.

The memory 132 stores information at the server 130, including information received from the BS 110 and information about the BS 110. This may include mobile reports (MRs) from mobile devices 120, such as reference signal received power (RSRP), reference signal received quality (RSRQ), channel quality indicator (CQI), signal to interference plus signal to noise ratio. The memory 132 may also store information about the engineering parameters of BS 110, such as electronic tilt (eTilt), azimuth, and mechanical tilt (mTilt). The memory 132 may also store instructions, functions and software applications that the server 130 may call on and execute. The network operator 133 manages the operation of the BS 110 (or a network of BSs in an alternative embodiment), and receives and processes information from the wireless communicator 131 and memory 132 to generate control signals for configuring the BS 110 or to communicate with other elements in the cellular network 100.

The controller 190 may be any component, or collection of components, adapted to perform network optimization for the wireless coverage area 101. The controller 190 may be co-located with the BS 110. Alternatively, the controller 190 may be a device that is separate and distinct from the BS 110, in which case the controller 190 may communicate with the BS 110 via the server 130. Alternatively, the controller 190 may be implemented as a component of the server 130 and therefore communicate with the BS 110 via the server's 130 communications capabilities. In another embodiment, the controller may also be a component of a second server that is communicatively linked with the server 130 and communicates with the BS via the server 130.

FIG. 2 illustrates an embodiment of a cellular network 200 comprising local coverage areas 201, 202, 203, 204, and 205 within which wireless access is provided to mobile devices 220 by BSs 211, 212, 213, 214, and 215 (respectively). It should be appreciated that the cellular network 200 is shown as including five BSs and coverage areas for purposes of brevity and clarity, but that any number of coverage areas and BSs can be employed in other examples of cellular networks. It should also be appreciated that, in some implementations, the cellular network 200 may be a heterogeneous network (Het-Net) in which at least some of the BSs 211, 212, 213, 214, and 215 communicate using different wireless access technologies.

Modifying wireless configuration parameters in a specific one of the coverage areas 201, 202, 203, 204, or 205 may affect performance in the specific coverage area, as well as other nearby coverage areas. For example, increasing a transmit power level in the local coverage area 205 may improve coverage and capacity in the local coverage area 205, while also increasing inter-cell-interference in the local coverage areas 201, 202, 203, and 204. Wireless configuration parameters in the local coverage areas 201, 202, 203, 204, and 205 may also complement one another in a manner that affects the overall performance of the cellular network 200. By way of example, the hysteresis margins of neighboring local coverage areas 201, 202, 203, 204, and 205 may affect mobility load balancing (MLB) and mobility robustness optimization (MRO) performance over the entire cellular network 200.

The controller 290, in one embodiment, may comprise a deep neural net (DNN), that is configured to generate results (e.g., optimization solutions, diagnoses, predicted values, etc.) by processing information (e.g., measurement reports, key performance indicators (KPIs), etc.) received from the BSs 211, 212, 213, 214, and 215 using various SON techniques, as described below. In one embodiment, the controller 290 generates alternative results using alternative SON techniques, as described below.

The controller 290 may use SON techniques to perform various SON-related tasks in the cellular network 200, such as a self-planning task, self-management task, self-optimization task, or self-diagnostic task. The term "SON technique" generally refers to any autonomous technique that is used to perform a SON-related task in the cellular network 200, where a result is output based on the employed SON technique. In one example, a SON technique is a self-optimization technique, and a result is an optimization solution generated by the self-optimization technique. In another example, a SON technique is a self-diagnostic technique, and a result is a diagnosis generated by the self-diagnostic technique. As yet another example, a SON technique is a prediction technique used when performing a SON-related task (e.g., self-planning, etc.), and a result is a prediction generated by the prediction technique. It is appreciated that the disclosed examples are non-limiting.

Alternative SON techniques may use strategies to solve the same SON-related problem. For example, one coverage capacity optimization (CCO) algorithm may use load-balancing strategies to achieve a desired level of coverage/throughput performance, while another CCO algorithm may rely heavily on interference reduction to achieve a similar level of performance by managing/reducing inter-cell interference. In such an example, the former CCO algorithm may seek to improve coverage/throughput by adjusting antenna tilts and/or transmit power levels in a manner that distributes traffic across multiple coverage areas, while the latter CCO algorithm may seek to improve coverage/throughput by adjusting antenna tilts and/or transmit power levels in a manner that reduces inter-cell interference.

As another example, a variety of self-healing techniques may be used for cell outage compensation (COC), for example, reinforcement learning based COC techniques, simulated annealing based techniques, and domain knowledge based COC techniques. As another example, a variety of diagnosis techniques are available to identify the problematic cells (e.g., Kalman-filter based anomaly detection technique, principle component analysis based anomaly detection techniques, etc.) and pinpoint the root cause for the identified problem (e.g., decision-tree based classification techniques, expert system based root cause analysis techniques, random forest based classification techniques, etc.). In another example, a variety prediction techniques are used to predict entities of interest, for example, KPIs (e.g., time-series based KPI prediction techniques, principle component regression based prediction techniques, partial least square based techniques), UE locations (e.g., fingerprint based UE localization techniques, Gaussian mixed model based techniques), etc.

By virtue of using these different strategies, alternative SON techniques may yield varying degrees of effectiveness across different network environments. Referring to the example discussed above, the CCO algorithm that relies heavily on load balancing may provide better coverage and/or throughput performance in wireless networks experiencing volatile traffic distributions (e.g., an influx of new subscribers), while the CCO algorithm that relies heavily on interference reduction may provide better coverage and/or throughput performance in wireless networks experience high traffic volumes. As a result, network operators may achieve vastly different performance depending on which SON technique they elect to use.

Figure 3:
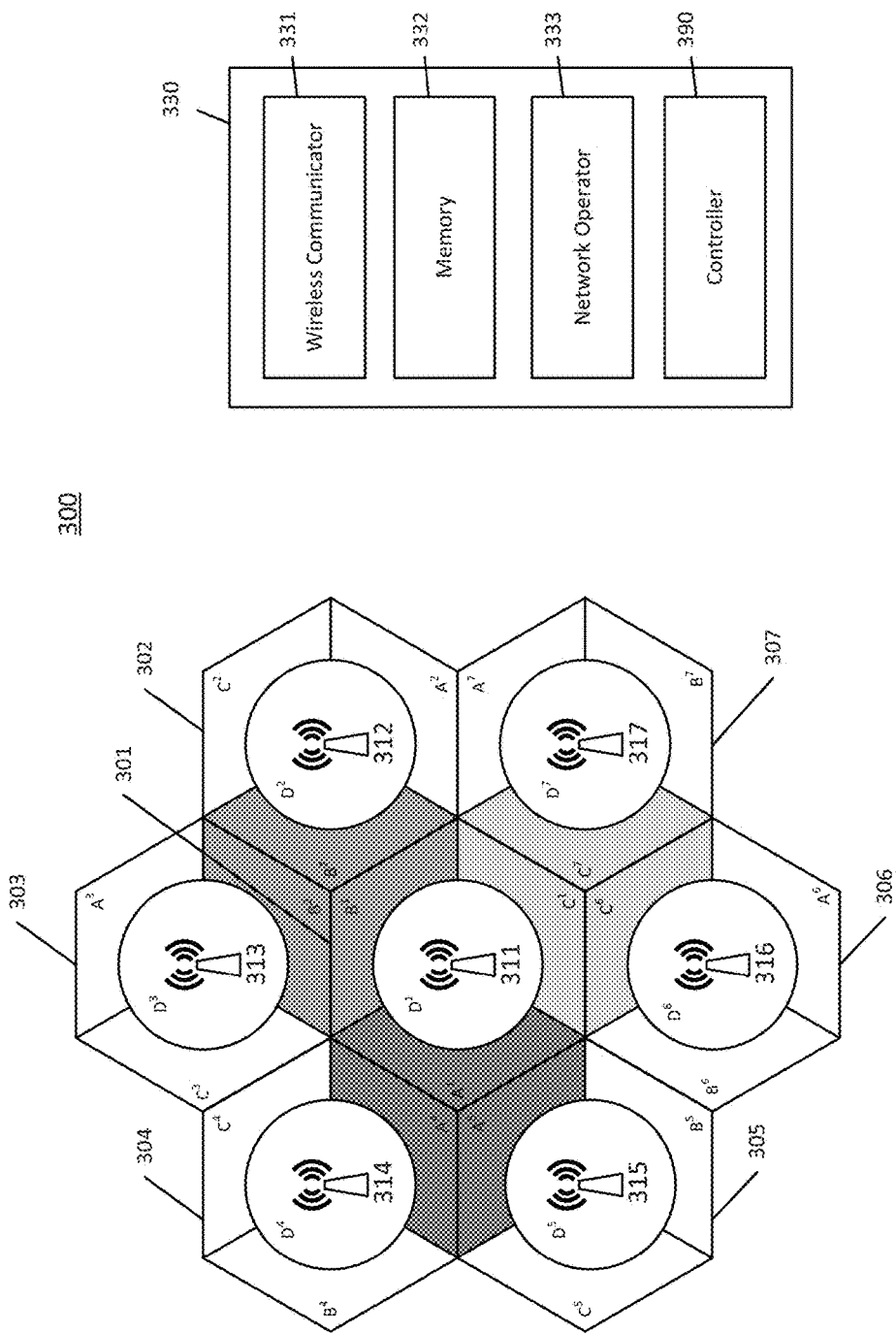
FIG. 3 illustrates a representation of the coverage areas of a cellular network as a hexagonal tiling.

FIG. 3 illustrates a representation of a cellular network 300 in the form of a hexagonal tiling. The cellular network includes BSs 311 to 317, each of which is surrounded by a geographic region of coverage that is represented by a hexagonal-shaped cell 401 to 407, respectively. Together, the cells 401 to 407 make up a group of cells.

In one embodiment, the area covered by the cells 301 to 307 do not overlap each other, but there may be some or substantial overlap of cells 301 to 307 in other embodiments. Neighboring cells 301 to 307 may affect each other such that a change in the settings of one BS, such as BS 311, may affect not only the coverage and capacity of the cell 301 in which BS 311 is located in, but also the coverage and capacity of neighboring cells 302 to 307, such as the coverage and capacity of the shaded regions at the intersections of multiple cells 301 to 307. Each cell group may have a certain layout or topology, which includes the relative distance between the cells 301 to 307 and their angular directions relative to each other. The cellular network shown in FIG. 3 is by way of example only and may vary in further embodiments.

It is understood that each hexagonal cell 301 to 307 is an idealized representation of the coverage areas of BSs 311 to 317 and may not reflect the shape or dimensions of the actual coverage areas. The actual coverage area of cells is difficult to predict since the size and shape of a cell's coverage area may vary due to various effects. For example, each base station's antennas may be positioned differently and there may be shadowing effects on radio coverage caused by obstacles such as buildings. Although the ideal representation of the coverage area of a cell may be a hexagonal cell having six neighbors of identical shape, the actual coverage areas of cells have differing sizes and shapes. Accordingly, the cells having the strongest relationship, interaction or interference with any particular cell might not be among the six bordering cells in a hexagonal grid as depicted in FIG. 3. It is possible that the nearby cells having the strongest relationship to a particular cell is one of twelve cells that may be adjacent to the ring formed by the six bordering cells.

Data from the BSs 311 to 317 in each of the cells 301 to 307 may be collected and uploaded to a server, such as server 330. Such data may include, for example, RSRP, RSRQ, channel quality indicator (CQI), signal to interference (SIR), noise ratio and engineering parameters such as electronic tilt, azimuth, and mechanical tilt. These parameters are by way of example, the other or alternative types of data may be collected in further embodiments. These data may be used to diagnose issues with the coverage and capacity of the cellular network 300 and used to optimize the cellular network 300. For example, the collected data from multiple channels may be arranged into a multi-dimensional multi-channel state tensor and fed as input data into a deep neural network in order to generate a set of recommendations for how cell parameters and BS settings may be adjusted to improve the coverage and capacity of the cellular network 300. This will be discussed in further detail in the following figures.

Figure 4:
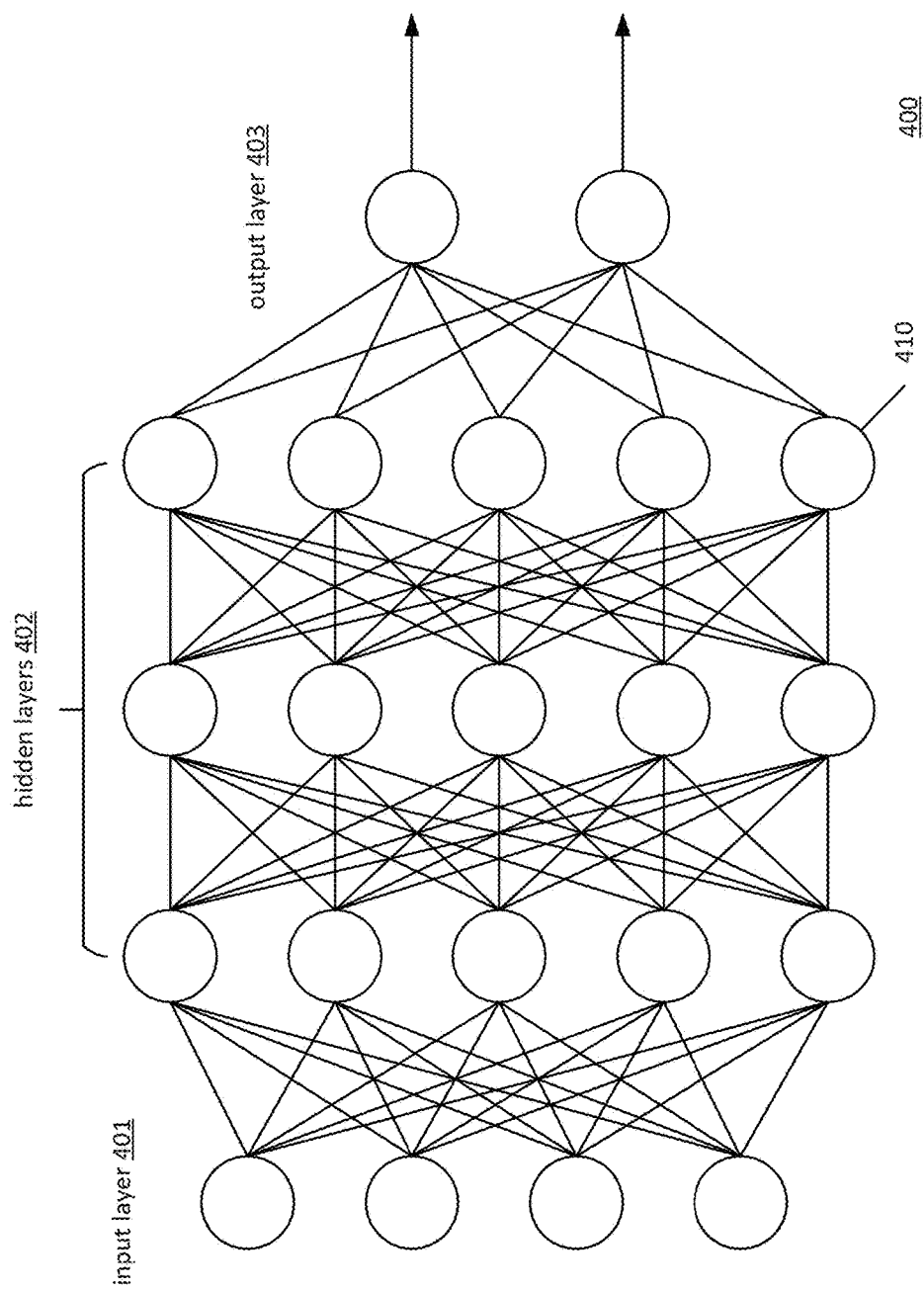
FIG. 4 illustrates an exemplary deep neural net in which embodiments of the present technology may be implemented.

FIG. 4 illustrates an exemplary deep neural net (DNN) 400 in which embodiments of the present technology may be implemented. As known in the art, a DNN is a neural net that has more than one hidden layer. The DNN 400 includes an input layer 401, a plurality of hidden layers 402, and an output layer 403. In the disclosed embodiment, the DNN 400 is illustrated as having three hidden layers 402, although it is understood that alternative embodiments may have any number of two or more hidden layers 402. Each layer 401 to 403 may have one or more nodes 410, also referred to as neurons in the art. It is understood that alternative embodiments may have fewer or more nodes 410 than what is depicted in FIG. 4. In one embodiment, every node 410 in a current layer in the DNN 400 is connected to every node 410 in a previous layer and a next layer. This is referred to as a fully-connected neural network. Other neural net structures are also possible in alternative embodiments of the DNN 400 where not every node 410 in each layer needs to be connected to every node 410 in the previous and next layers.

In one embodiment, each node 410 in the input layer 401 may be assigned a value and may output that value to every node 410 in the next layer (a hidden layer 402). In one embodiment, the assigned values may be either a zero or a one. In another embodiment, the values may be any real number between zero and one. The input nodes 410 may represent features about the world. For example, a DNN that is used for classifying whether an object is a rectangle may have an input node that represents whether the object has flat edges, in which assigning a value of 1 to the node may represent that the object does have flat edges and assigning a value of 0 to the node may represent that the object does not have flat edges. There may be other input nodes 410 in the input layer 401 that may represent other features, such as whether the object has corners with angles of ninety degrees. Similarly, for a DNN that takes in an image as input, the nodes 410 of the input layer 401 could each represent a pixel of the image, where the assigned value may represent an intensity of the pixel such that an assigned value of 1 means that the pixel is completely black and an assigned value of 0 means that the pixel is completely white. In one embodiment, a neural net for optimizing a wireless network may have an input layer 401 having a node 410 for representing an interference factor for every permutation of a pair of cells among a group of cells in the wireless network 100 (FIG. 1). For example, in one embodiment, once a group of cells comprising cells 1, 2, and 3 is generated, there would be a separate node in the DNN 400 for representing an interference factor between cells 1 and 1, 1, and 2, 1 and 3, 2 and 1, 2 and 2, 2 and 3, 3 and 1, 3 and 2, and 3 and 3.

Each node 410 in the hidden layers 402 may receive an outputted value from one or more nodes 410 in a previous layer and associate each of the one or more nodes 410 in the previous layer with a weight, the weight having a value between zero and one. Each node 410 in the hidden layers 402 may then multiply each of the received values from the one or more nodes 410 in the previous layer with the weight associated with the one or more nodes 410 in the previous layer and output the sum of the products to each of the one or more nodes 410 in the next layer.

Nodes 410 in the output layer 403 handle input values received from nodes 410 in the hidden layers 402 in a similar fashion as previously described with respect to nodes in the hidden layers 402. In one embodiment, each node 410 in the output layer 403 may multiply each input value received from each of the nodes 410 in the previous hidden layer 402 with a weight and sum the products to generate an output value. The output values of the nodes 410 in the output layer 403 may supply desired information in a predefined format, wherein the desired information may have some relationship to the information (input) supplied to the nodes 410 of the input layer 401. Examples of what the output layer 403 may represent include, but are not limited to, classifications, relationships, measurements, instructions, and recommendations. As an illustrative example, a DNN 400 that classifies whether an image is a rectangle or an ellipse may have a first node 410 in the output layer 403 for indicating whether the object is a rectangle or not, where in an outputted value of 1 represents that the object is a rectangle and an outputted value of 0 represents that the object is not a rectangle. The output layer 403 may further have a second node 410 for indicating whether the object is an ellipse or not, wherein an outputted value of 1 from the second node represents that the object is an ellipse and an outputted value of 0 represents that the object is not an ellipse. While the examples provided above relate to classifying geometric shapes, this is only for illustrative purposes, and the nodes 410 of the output layer 403 of a DNN may be used to classify any of a wide variety of objects and other features and otherwise output any of a wide variety of desired information in desired formats.

Alternatively, the nodes 410 in the output layer 403 may each represent a recommendation. For example, according to one embodiment of the present technology, a DNN 400 for optimizing a cellular network may have a node 410 in the output layer 403 that represents whether to increase the tilt of an antennae on a base station in the wireless network 100, wherein an outputted value of 1 represents increasing the tilt by a predetermined incremental amount and an outputted value of 0 represents not increasing the tilt of the antennae.

The number of nodes 410 in each layer, and the number of layers (i.e. the depth) of the DNN 400 affects the complexity of the DNN 400 and therefore its ability to find solutions and how quickly the DNN 400 can be trained. Typically, with a greater number of nodes 410 in each layer 501, 502 and 503 and a greater the number of layers, a DNN 400 becomes more capable of solving complex problems, but also would take longer to train.

Figure 5:
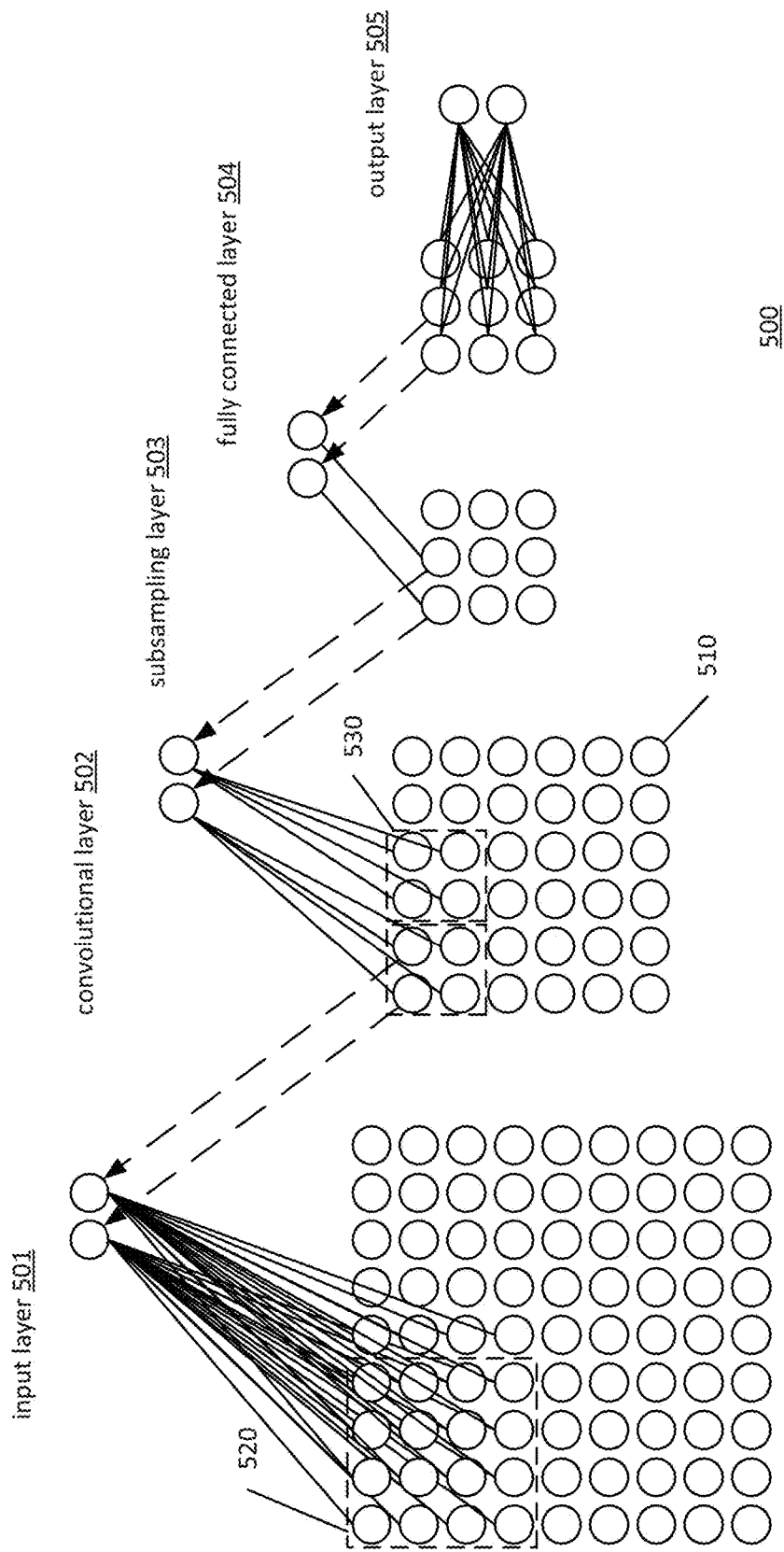
FIG. 5 illustrates an exemplary deep neural net in the form of a convolutional neural net in which embodiments of the present technology may be implemented.

FIG. 5 illustrates an exemplary convolutional neural net (CNN) 500 in which embodiments of the present technology may be implemented. In one embodiment, the CNN 500 may have an input layer 501, a convolutional layer 502, a subsampling layer 503, a fully connected layer 504, and an output layer 505. It is understood that in alternative embodiments, the CNN 500 may have additional convolutional layers 505 and subsampling layers 503. In one embodiment, the alternating convolutional layers 502 and subsampling layers 503 may be followed by more than one fully connected layer 504. The dashed arrows in FIG. 5 indicate nodes that are isolated in the drawing to more clearly demonstrate their connectivity to nodes in a previous layer. Thus, the circles at the two ends of the dashed arrows represent the same node. Accordingly, the dashed arrows do not represent connections between different nodes.

A CNN 500 is a type of DNN 400 (FIG. 4) having three additional features: local receptive fields, shared weights, and pooling. The input layer 501 and output layer 505 of a CNN 500 function similar to the input layer 401 and output layer 403 of the DNN 400, as depicted in FIG. 4. The CNN 500 is distinguished from the DNN 400 (FIG. 4) in that the hidden layers 402 of the DNN 400 are replaced with one or more convolutional layers 502, subsampling layers 503, and fully connected layers 504. The use of localized receptive fields involves having nodes 510 in the convolutional layers 502 of a CNN 500 receive inputs from localized regions 520 in the previous layer. The use of shared weights involves having each node 510 in a convolutional layer 502 of a CNN 500 assigning the same set of weights to the relative positions of a localized region 520.

Figure 6:
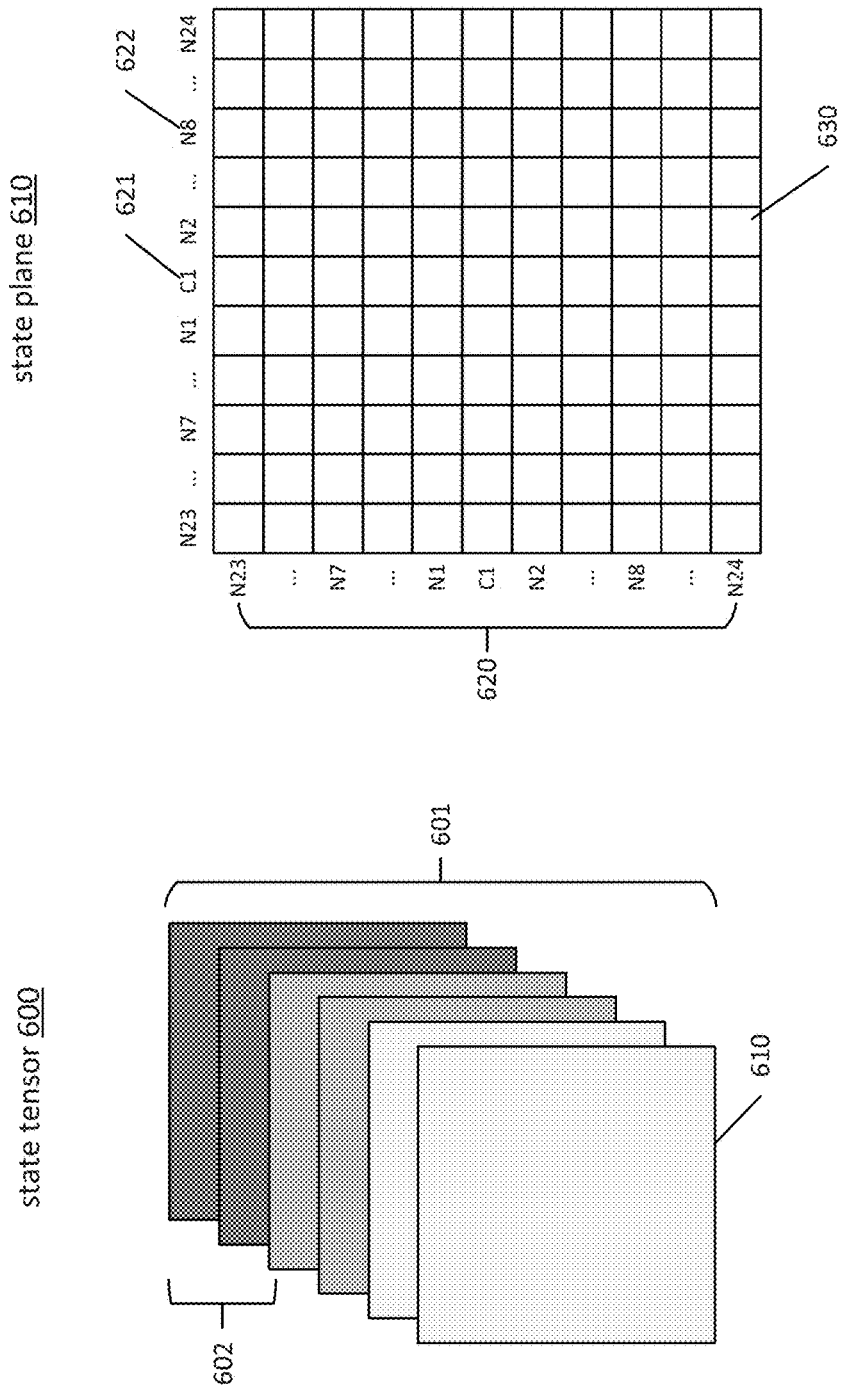
FIGS. 6a and 6b illustrate a state tensor and a state plane, respectively, for structuring the data collected about a cellular network according to embodiments of the present technology.

Unlike the nodes 410 of the hidden layers 402 in FIG. 4, nodes 510 in a convolutional layer 502 do not receive an outputted value from every node 510 in the previous layer. Rather, each node 510 in the convolutional layer 502 receives an outputted value only from nodes 510 within a localized region 520 in the previous layer. In one embodiment, as depicted in FIG. 6, the localized region 520 is a 4 by 4 set of nodes 510 in the input layer 501. It is understood that the localized region 520 may be larger or of a different shape in alternative embodiments. Each 4 by 4 region 520 (i.e., localized region) in the input layer 501 corresponds to a node 510 in the convolutional layer 502 such that each node in the convolution layer 502 maps onto a different 4 by 4 region 520 of the input layer 501.

The use of shared weights is another feature of the convolutional layer 502. Each node 510 in the convolutional layer 502 may assign a weight to each of the outputted values of the nodes 510 in the localized region 520. Unlike the DNN 400 in FIG. 4, where different nodes 410 in a hidden layer 402 may assign a different set of weights to the outputted values received from a previous layer, nodes 510 in a convolutional layer 502 assigns the same set of weights to the values outputted by the nodes 510 in the localized region 520 corresponding to the node 510 on the convolutional layer 502.

In the example of FIG. 5, two of the nodes 510 in the convolutional layer 502 have been isolated, as indicated by the dashed arrows, to illustrate their connectivity to the nodes 510 within the localized regions 520 on the input layer 501. As previously mentioned, nodes in a convolutional layer 502 of a CNN all use the same set of weights with respect to positions on localized regions 520 of a previous layer. For example, for a localized region 520 consisting of 9 nodes 510 arranged in a 3 by 3 square, nodes 510 on the left and right columns may be assigned a weight of zero while the nodes 510 in the center column may be assigned a weight of one. For a CNN 500 that takes in a set of pixel intensities as its input layer, such an arrangement of weights for nodes 510 on a convolutional layer 502 that receives input from the input layer 501 may indicate that nodes 510 of that convolutional layer 502 of the CNN 500 may be trying to identify vertical lines in localized regions 520 of the input layer 501, or at least when 3 high intensity nodes 510 may be arranged in a vertical line. In this way, the nodes 510 of the convolutional layer 502 may be understood as detecting features in localized regions 520 of a previous layer.

Thus for CNNs, each node 510 in the convolutional layer 502 responds to the same feature, but in a different localized region 520 of the input layer 501. For example, each node 510 in the convolutional layer 502 may assign a set of weights to be applied to outputted values from nodes within the localized region 520 that the node 510 is connected to. Each node 510 in the convolutional layer 502 will multiply the outputted value the node has received from the nodes 510 of a localized region 520 in the previous layer with a weight having a value of between zero and one. The node may then output a value to the next layer that is the sum of all the products. The output is then received as an input by nodes in the next layer.

The subsampling layer 503 performs a pooling operation on the outputted values from the previous layer. In one embodiment, the convolutional layer 502 is divided into 2 by 2 sections 530, each section 530 corresponding to a node 510 in the subsampling layer 503. In one embodiment, the highest value of the outputted values from the nodes 510 in a 2 by 2 section 530 in the previous layer is outputted by the nodes 510 of the subsampling layer 503. In alternative embodiments, other operations may be used, such as finding an average of the outputted values from the nodes within a 2 by 2 section 530 in the previous layer. This pooling operation condenses a layer of nodes 510 into a layer with fewer nodes 510, thereby reducing the complexity of the CNN 500, leading to faster processing speeds.

The fully connected layer 504 operates similarly to the hidden layers 402 from FIG. 4 in that each node in the fully connected layer 504 is connected to every node 510 in the previous layer and receives an outputted value from every node 510 in the previous layer. These layers allow the CNN 500 to perform additional processing based on the features that were identified and pooled in the convolutional layer 502 and the subsampling layer 503.

The above description of deep neural networks and convolutional networks is provided for a general understanding of such networks. FIGS. 6a to 14 show how inputs for such networks may be derived in accordance with aspects of the present technology. In accordance with aspects of the present technology, raw data relating to the operational communication conditions of a cellular network may be collected and used to derive state planes, which in turn may be organized into multi-dimensional state tensors. The state tensors may then be used as input to a deep neural network. The derivation of state planes from the raw data, and the organization of the state planes into multi-dimensional state tensors allows faster processing of the data by the above-described neural networks. These features will now be described with reference to FIGS. 6a to 14.

FIGS. 6a and 6b illustrate an embodiment of the present technology involving a multi-dimensional multi-channel state tensor 600 that may be used to store information collected about the operational communication conditions of a cellular network 100 (FIG. 1). A state tensor 600 is a multi-dimensional data structure that may, for example, be implemented as a multi-dimensional array. In one embodiment, a state tensor 600 has three dimensions and comprises a plurality of state planes 610. The state tensor 600 may have more or fewer dimensions and include any number of one or more state planes 610 in alternative embodiments.

A state plane 610 is a two-dimensional data structure that may, for example, be implemented as a two-dimensional array to store data relating to the operational communication conditions of cells in the cellular network. A state plane 610 has horizontal and vertical axes 620 and a plurality of data fields 630, which store information about the cellular network 100 (FIG. 1). As will be discussed in greater detail with respect to FIG. 15, the information stored in the data fields 630 may be received as input by the nodes of a deep neural network. In this way, the state tensor 600 behaves like the input layer 501 of the deep neural network 500 from FIG. 5. Thus, by structuring information about a cellular network in a state tensor 600, the present technology allows a deep neural network to take the information stored in the state tensor 600 as input for computing solutions for optimizing the cellular network.

In one embodiment, the data fields 630 in a state plane 610 may contain information regarding cell features. A cell feature is a type of information about the operational communication conditions of cells in the cellular network, including information about a cell or the relationship between a pair of cells, such as the mechanical tilt of a cell's base station or the amount of interference between two cells. In addition, different cell features may be received from different information channels. An information channel as used herein is a source of information relating to the features of a cell. Examples of information channels include (1) cellular network topology, which may provide information on features such as distance between base stations, angular location of base stations relative to each other, and base station height, (2) engineering parameters, which may provide information on features such as azimuth, mechanical tilt, and electrical tilt of base stations, (3) key performance indicators, which may provide information on features such as throughput and cell load, and (4) mobile reports from user devices, which may provide information on features such as reference signal received power, reference signal received quality, signal interference to noise ratio, and channel quality indicator, objective functions, cumulative distribution functions of network performance measures, and interference factor matrices.

Figure 7:
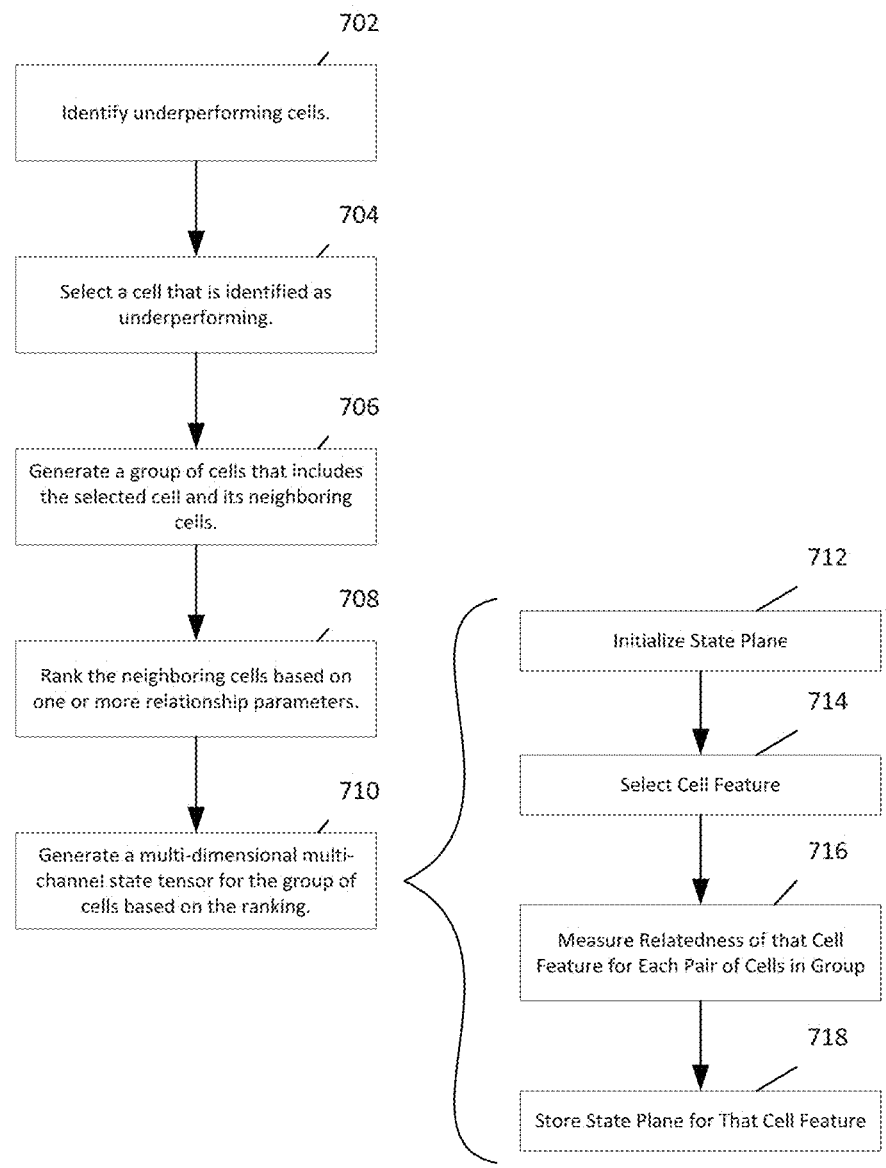
FIG. 7 is a flowchart illustrating the operation of an embodiment of the present technology.
Figure 8:
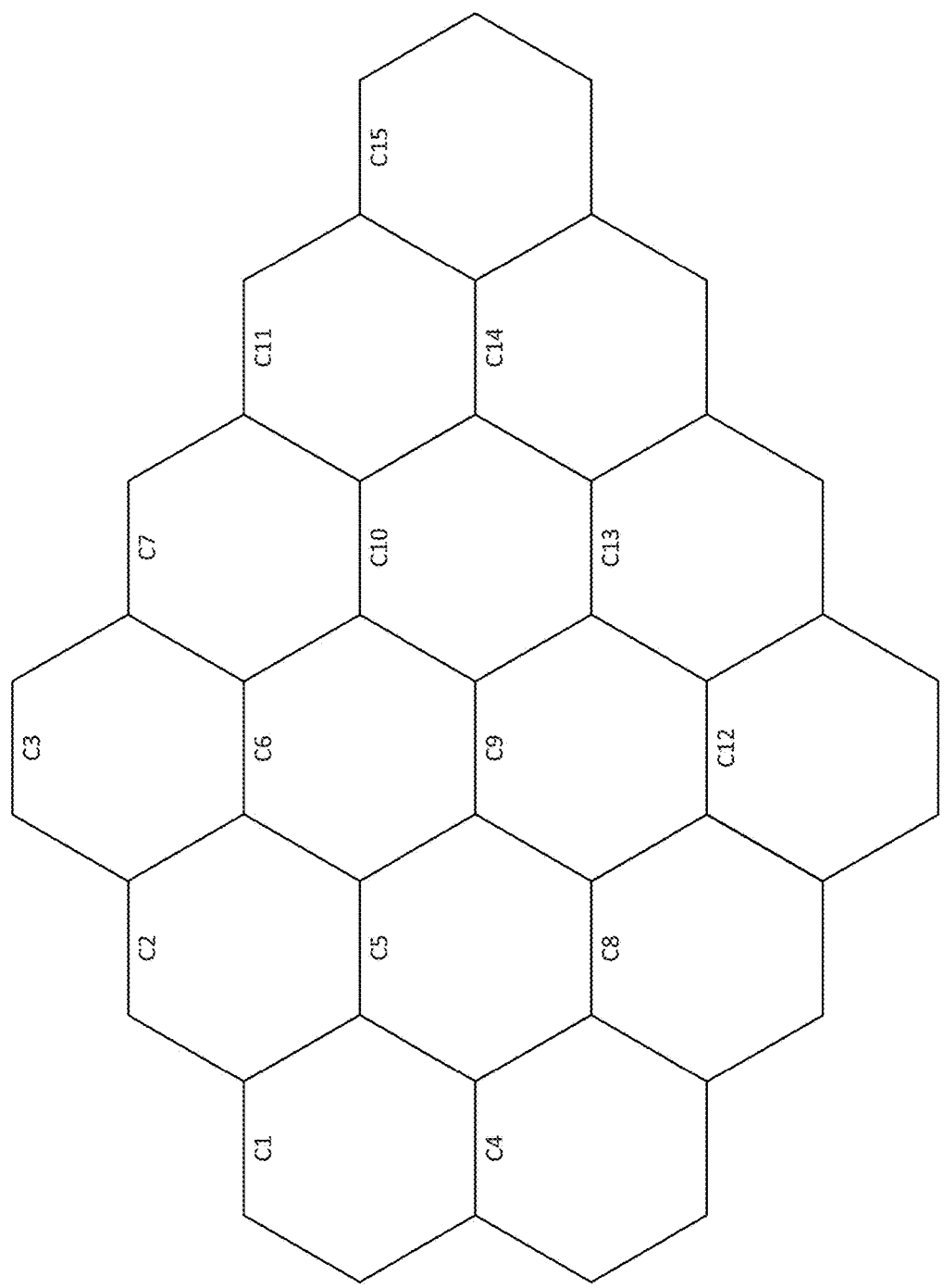
FIGS. 8-11 are illustrations of a cellular network including an underperforming cell.

In one embodiment, the state tensor 600 may include one or more sets 601 of state planes 610 each storing information about a different cell and its neighboring cells in a cellular network. Each state plane corresponds to cell feature (e.g. mTilt). Formation of a state plane 610 from the data on cell features will now be explained to the flowchart of FIG. 7 and the illustrations of FIGS. 8-14. FIG. 7 illustrates a flowchart for the operation of one embodiment of the present technology in optimizing cellular networks. FIG. 8 is an illustration of a sample cellular network including 15 base stations, arbitrarily numbered 1-15 as shown in FIG. 8.

At step 702, the system identifies underperforming cells. In one embodiment, this can be done by constantly monitoring whether various cell measurements exceed one or more predetermined upper and/or lower value thresholds. Examples of such measurements include, but are not limited to, key performance indicators, key quality indicators, and objective functions. More specifically, for example, noise and interference may be compared to thresholds that define an upper limit while signal quality thresholds may be compared to minimum threshold values. In some embodiments, determining whether a cell is underperforming may be based on severity, weight, time since the cell was last optimized, and whether these values exceed a predetermined threshold. Other criteria may be incorporated in addition to or instead of the criteria mentioned in alternative embodiments.

Figure 9:
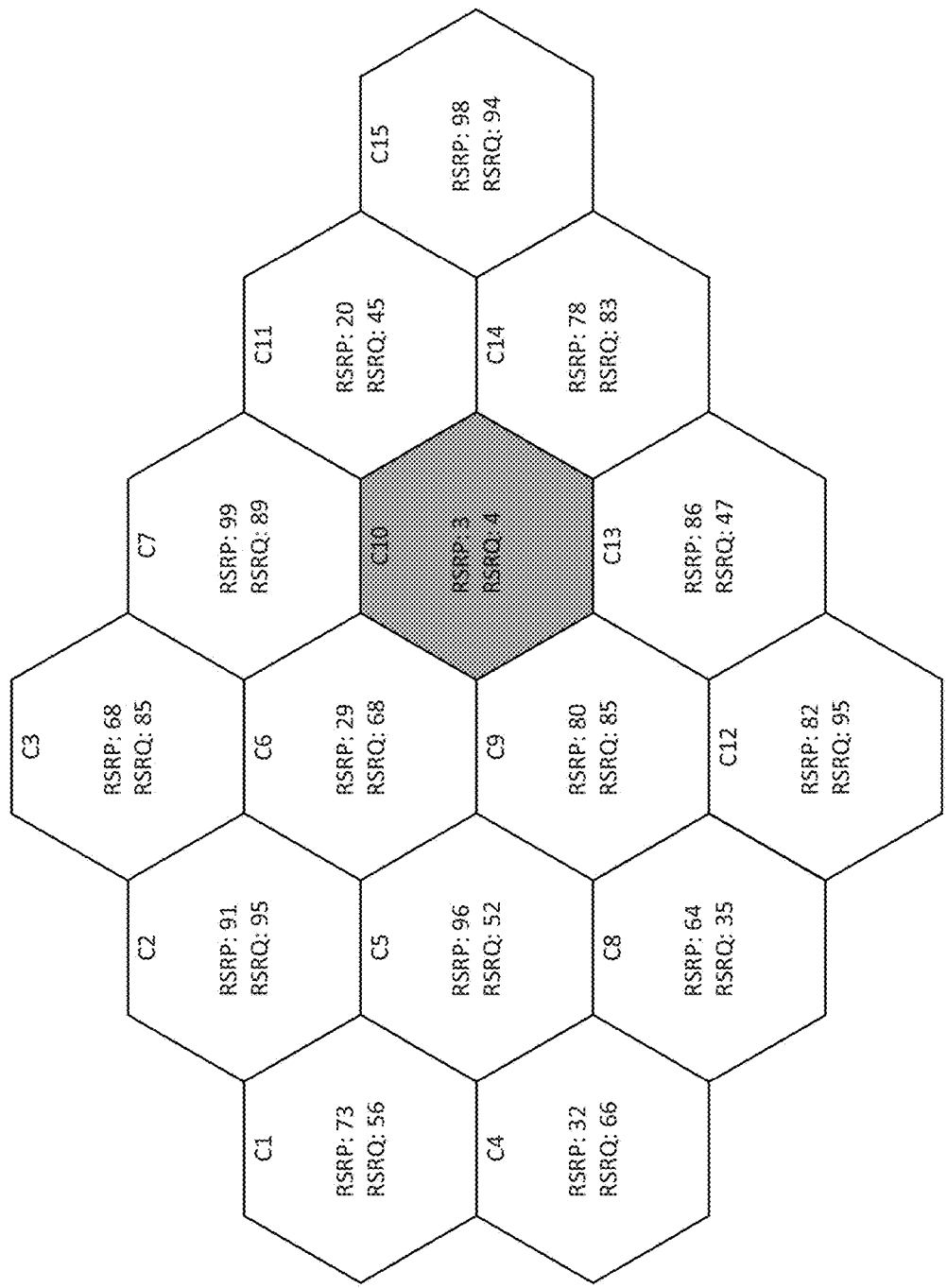

FIG. 9 shows one of several possible examples where the system measures performance by monitoring a reference signal received power (RSRP) and a reference signal received quality (RSRQ) value for each cell in the cellular network. As noted, other cell features may be used when monitoring the network for underperforming cells. The RSRP and RSRQ values are then normalized. In one embodiment, the highest RSRP and RSRQ values received by the system are subtracted from the lowest RSRP and RSRQ values received to determine a variance value for RSRP and RSRQ. The RSRP and RSRQ values for each cell are then normalized by subtracting the RSRP and RSRQ values for each cell by the lowest RSRP and RSRQ values received by the system and dividing the results by the variance values for RSRP and RSRQ. This produces a normalized RSRP value and a normalized RSRQ value. FIG. 9 shows sample RSRP and RSRQ values for cells 1 to 15, normalized to values between zero and 100.

In one embodiment, a weight of 0.75 may be assigned to the normalized RSRP value while a weight of 0.25 may be assigned to the normalized RSRQ value. These weights are by way of example and may vary in further embodiments. The RSRP and RSRQ values for each cell may then be multiplied by their assigned weights and then added together to produce an overall performance value. A predetermined threshold for identifying underperforming cells may be set, such as for example to be 5. Thus, any cell having a performance value of less than 5 is identified to be underperforming. In one embodiment, selecting an underperforming cell is done by assigning a priority value to all underperforming cells and selecting the cell having the highest priority value.

Figure 10:
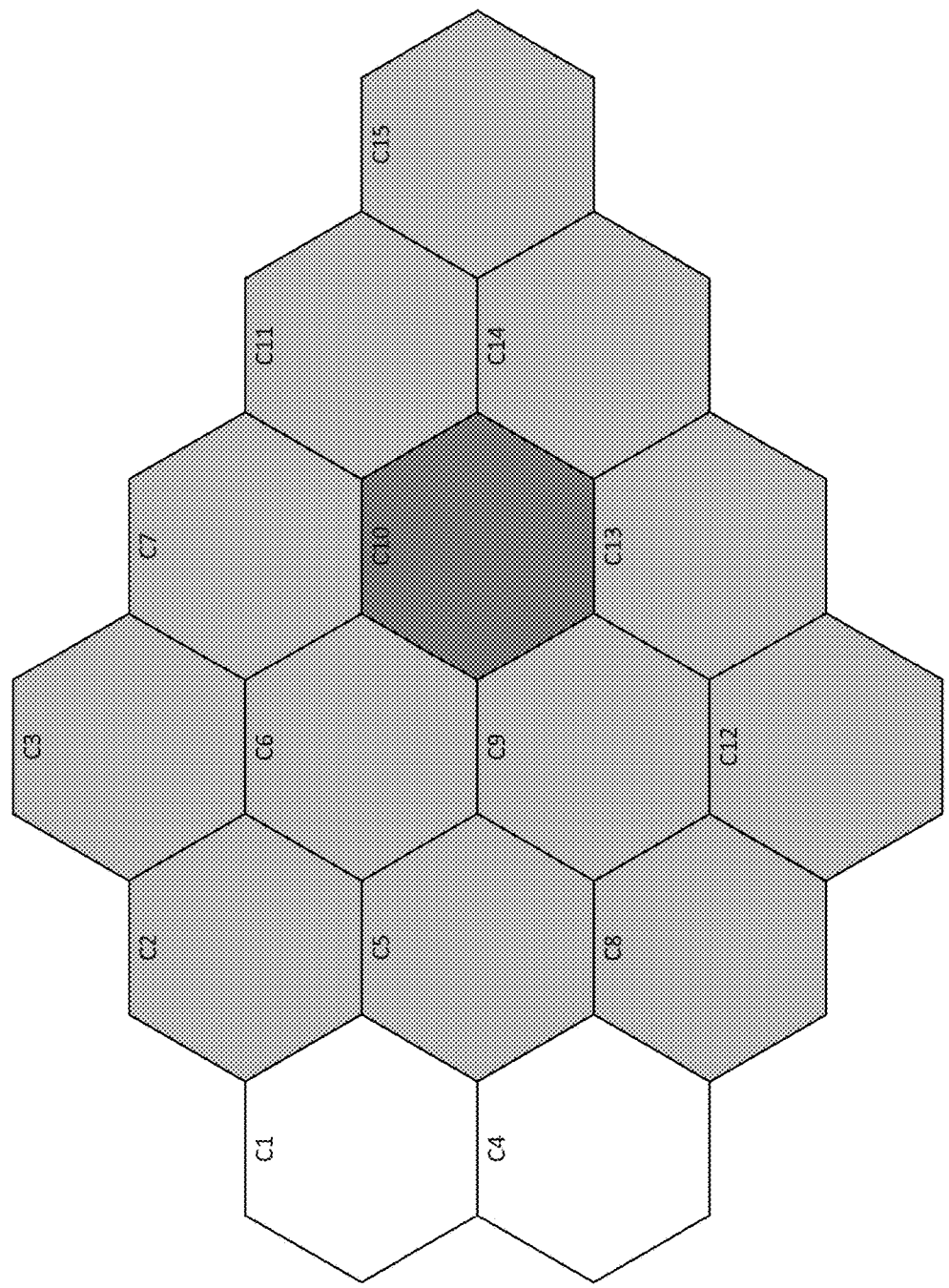

At step 704, the system selects one of the cells that is underperforming for optimization. In the example of FIG. 9, cell 10 is below the threshold and may thus be selected as an underperforming cell. At step 706, the system generates a group of cells, represented, for example, as a list, an array, or some other data structure, comprising the selected cell and its neighboring cells. In some embodiments, groups may be generated based on location, neighbor relationships, and/or size of groups. Other criteria may be incorporated in addition to or instead of the criteria mentioned in alternative embodiments. In the embodiment of FIG. 10, the system has been set to select all neighboring cells within two cells of the identified underperforming cell. In the cellular network of this example, this is all cells except cells 1 and 4.

At step 708, the system ranks the neighboring cells associated with the selected cell based on one or more relationship parameters between the selected cell and the neighboring cells. In general, this relationship parameter may be a measure of how related a neighboring cell is to the selected cell with respect to one or more cell features. The concept of relatedness here may be any logical relationship between the two cells involving one or more cell features. In one embodiment, two cells may be highly related with respect to a given cell feature where the two cells exhibit the same measure for that cell feature. In another embodiment, two cells may be highly related with respect to a given cell feature where the two cells vary together with respect to that cell feature. In a further embodiment, two cells may be highly related for a cell feature where the two cells vary inversely with each other with respect to that cell feature. Other relationships may be used as a measure of relatedness.

The ranking may be based on one or more relationship parameters between each of the neighboring cells 622 and the selected underperforming cell 621 such that neighboring cells 622 having a stronger relationship with the selected cell 621 are positioned closer to the selected cell 621 on the axes of state plane 610. In embodiments, cell features believed to have the greatest effect on cell performance may be used in measuring relatedness. However, any of a wide variety of cell features may be used in measuring relatedness. In one embodiment shown in FIGS. 11-14, cell features of interference, cell distance and cell power are used together. That is, each neighboring cell may be evaluated to determine how related that cell is to the selected underperforming cell for the cell features interference, cell distance and cell power, considered together. Here, interference between two cells may be the degree to which the operation of one cell affects the other. Distance may be a measure of the distance between two cell base stations. And cell power may be a measure of the power output of one cell relative to another. A wide variety of other cell features and combinations of cell features may be selected to evaluate the relatedness of cells with respect to these one or more features.

Figure 11:
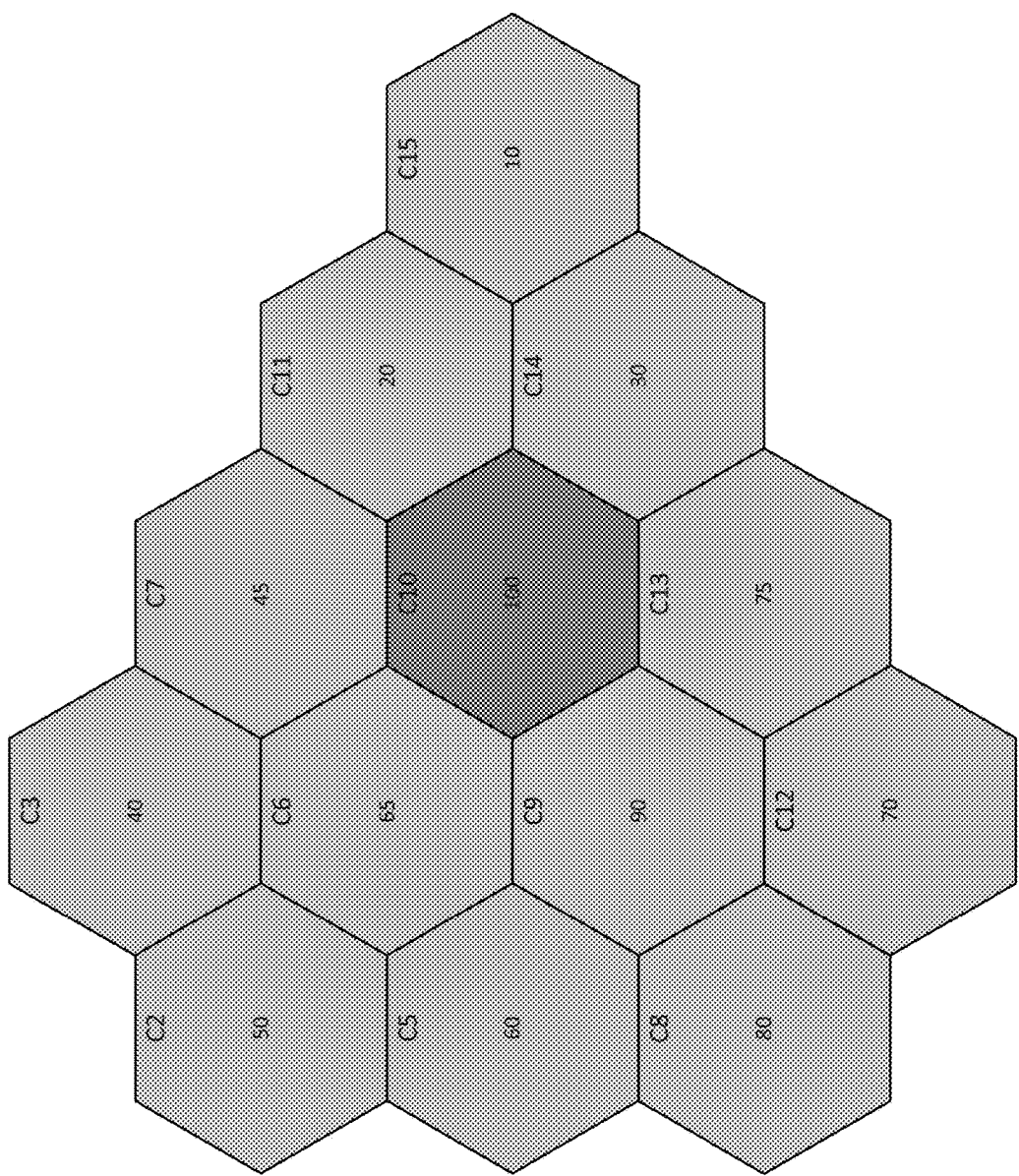

FIG. 11 shows the cells of FIG. 10, together with arbitrary, normalized values for the interference, cell distance and power of each neighboring cell with respect to the selected underperforming cell. In embodiments, values for each of the cell features used in the ranking may be determined individually, weighted, summed and then normalized as described above. A smaller value in a cell means less relatedness between that cell and the selected underperforming cell for those features, and a higher value in a cell means more relatedness between that cell and the underperforming cell for those features. Thus, for example cell 8 has a normalized value of 80 with the underperforming cell 10. In the example, despite being closer, the neighboring cell 11 has a normalized value of 20 with the underperforming cell. This could be due to a variety of factors, including for example a very low interference between cells 10 and 11.

Neighboring cells with a higher relatedness value are assigned a higher rank. The system thus ranks the 12 neighboring cells as shown in Table 1 below:

TABLE 1

| Cell | Relatedness Value | Rank |
|------|-------------------|------|
| C9   | 90                | N1   |
| C8   | 80                | N2   |
| C13  | 75                | N3   |
| C12  | 70                | N4   |
| C6   | 65                | N5   |
| C5   | 60                | N6   |
| C2   | 50                | N7   |
| C7   | 45                | N8   |
| C3   | 40                | N9   |
| C14  | 30                | N10  |
| C11  | 20                | N11  |
| C15  | 10                | N12  |

At step 710, the system generates a multi-dimensional multi-channel state tensor for the group of cells based on the ranking. In one embodiment, this is done by initializing a first state plane 610 (also referred to herein as a base grid) in step 712 having a fixed predetermined size and dimensions, such as for example n×n, where n is the number of cells in the group (13 in the current example). Once the size is determined, the state plane 610 may be initialized by allocating sufficient memory based on the size. In an alternative embodiment, the size of the base grid may be flexible and dynamic with a specified maximum size. The selected cell and its neighboring cells may be placed along the horizontal and vertical axes of the base grid. In one embodiment, the selected cell is placed at the center of the horizontal and vertical axes and the neighboring cells having the highest ranking are placed closer to the selected cell on the horizontal and vertical axes. In alternative embodiments, the selected cell may be placed at one end of the horizontal and vertical axes (e.g. the top of the vertical axis and the left-most position of the horizontal axis) and the neighboring cells having the highest ranking are placed closer to the selected cell.

Figure 12:
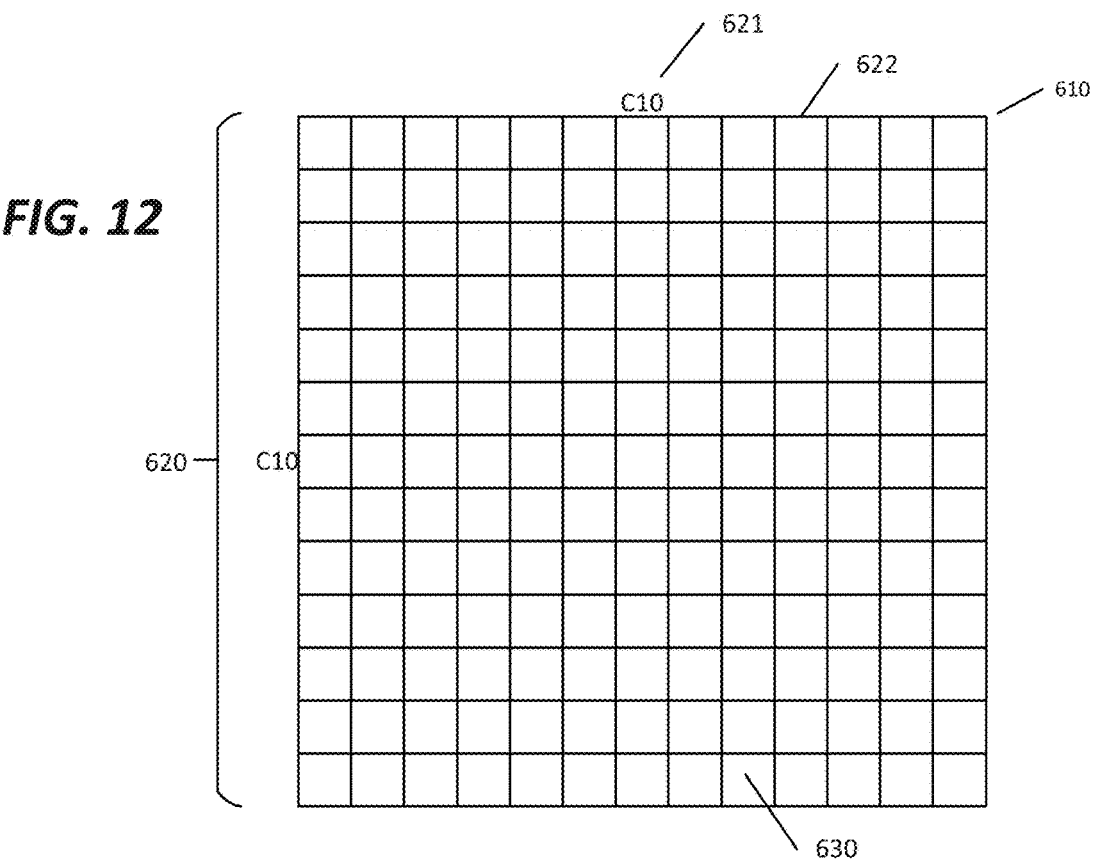
Figure 13:
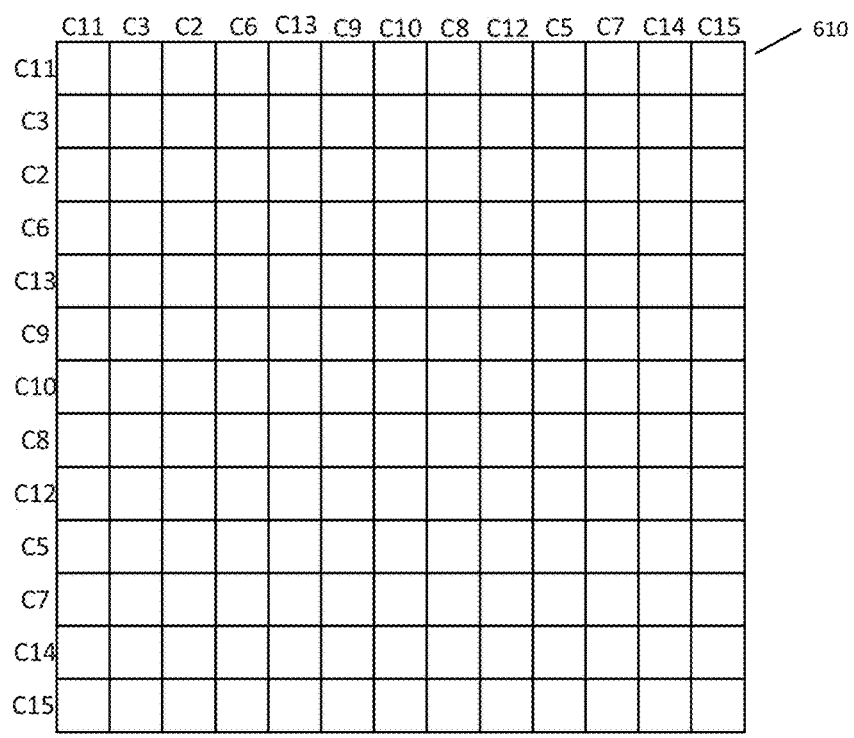

FIG. 12 shows a state plane 610 including the selected underperforming cell 10 at the center along the horizontal and vertical axes. FIG. 13 shows the remaining cells filled in ranked order, with the highest ranked cells (Table 1 above) situated closest to the selected underperforming cells. As set forth below, this ranking is significant in that information about closely related cells are clustered closer together and may therefore more likely fall within the local receptive fields of nodes within convolutional layers of a convolutional neural net (CNN) when the state tensor 600 is fed into the CNN as input.

In step 714, the state plane including the ranking described above is populated with data relating to a selected cell feature. In particular, each cell in the group is compared against each other cell in the group to arrive at normalized values indicating the relatedness of each cell to each other cell with respect to the selected cell feature. As one example, interference (by itself) may be selected, and normalized values may be determined indicating the relatedness of each cell to each other with respect to interference. Cells which interfere greatly with each other may have a high relatedness value, while cells which interfere only slightly with each other may have a low relatedness value. Relatedness values may be determined in step 716, and the resulting state plane 610 may be stored in step 718.

FIG. 14 shows a state plane 610 including sample values determined in step 716 showing the normalized interference values for different cells relative to the each other (the data fields 630 of the state plane 610 of FIG. 14 is shown partially filled, but would have values for each respective cell pair). The interference value for a cell with itself may be set at 100, and like pairs will have the same value in the two positions where those pairs come together in the state plane; that is, for example, the pair C2, C11 has the same value as the pair C11, C2 (both 49 in the arbitrary example of FIG. 14). Both pairs indicate the normalized interference value between cells C11 and C2.

Steps 712 to 718 may be repeated, using other cell features, to generate additional state planes 610 to be grouped in a state tensor 600. Each such state plane would keep the same relatedness rankings determined in step 708 as described above. These additional state planes may have the same axes and store other types of information regarding other features about cell pairs. As one further example, a distance between each pair of a cells is collected and stored in a respective data field 630 within a state plane 610 for all data fields 630 within the state plane 610. In alternative embodiments, information about more than one feature or channel may be stored in a single data field 630.

Referring again to FIG. 6A, each set 601 of state planes 610 may include one or more subsets 602 of state planes 610 (distinguished by different levels of shading in FIG. 6a), each storing information received from a different information channel. A subset of state planes corresponds to a channel of information (e.g. engineering parameters or mobile reports from user devices). Multiple subsets can make up a set of state planes (as represented by the state tensor 600, FIG. 6A). A set of state planes correspond to a group of cells comprising an underperforming cell and its neighbor cells. Each state plane within a set of state planes stores information on the same group of cells.

As one example of state planes grouped by channels, the subset 602 having darkest shade may store information regarding cellular network topology, the subset 602 with the lightest shade may store information regarding engineering parameters, and the subset 602 in the middle may contain information regarding key performance indicators (KPIs). A subset 602 of state planes 610 may further include one or more individual state planes 610. As discussed above, each individual state plane 610 within a subset 602 may contain information about one cell feature from the channel associated with the subset 602. For example, a first state plane 610 within the subset 602 having the darkest shade may contain information on distances between cells' base stations and a second state plane 610 from the same subset 602 may contain information on the heights of base stations. It is understood that there may be other variations on how to structure the storage of information involving multiple channels, features, sets, and subsets of state planes 610 in alternative embodiments.

Combining multiple channels of information into a multi-dimensional state tensor 600 and feeding the state tensor 600 as input data into a deep neural net, such as a convolutional neural net, enables the neural net to find patterns and insights across multiple information channels. By structuring information in a state tensor 600 as described above, information about closely related cells are clustered closer together and may therefore more likely fall within the local receptive fields of nodes within convolutional layers of a convolutional neural net (CNN) when the state tensor 600 is fed into the CNN as input. As a result, the convolutional layers of the CNN are more able to more quickly and more likely identify patterns and relationships between closely-related cells when processing the information in the state tensor 600. Processing of the information in the state tensor 600 is further discussed with respect to FIG. 15. This approach to structuring information in a state tensor 600 presents a significant advantage to a deep neural network's ability to identify patterns and insights and use them to generate optimization solutions.

In at least some of the embodiments described above, the positioning of the selected cell 621 and the one or more neighboring cells 622 on the axes 620 is the same for all state planes 610 in the state tensor 600 based on the same ranking of neighboring cells 622. In alternative embodiments, while the positioning may be the same for all state planes 610 within a set 601 or a subset 602 of state planes 610, different sets 601 or subsets 602 of state planes 610 employ different positioning of the cells on their horizontal and vertical axes 620 reflecting a different ranking of neighboring cells 622.

Figure 15:
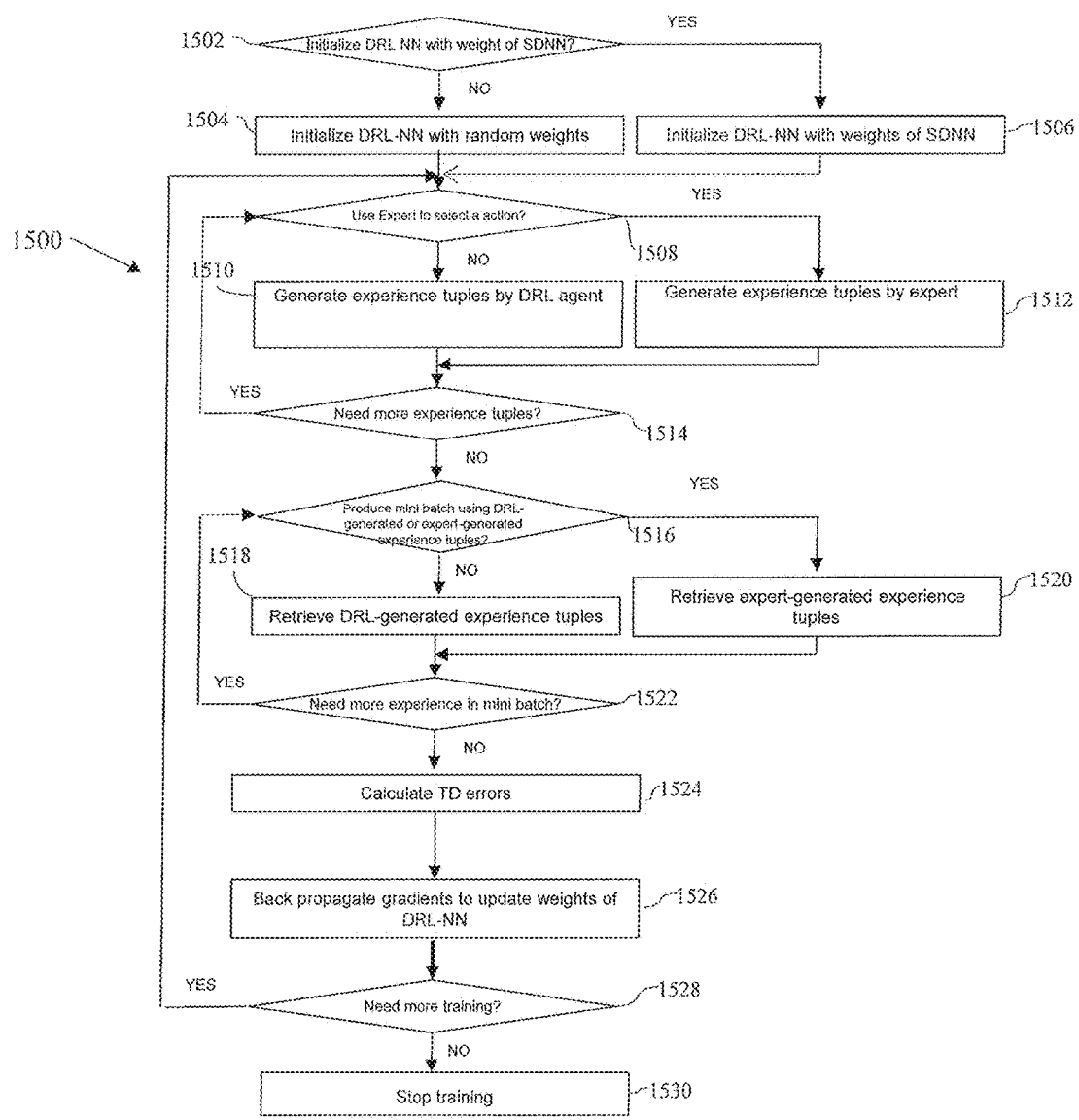
FIG. 15 is a flowchart showing the operation of a neural network to correct cell features of cells within a cellular network.

FIG. 15 illustrates a flowchart of an embodiment method 1500 for using state tensors in a neural network to adjust cell parameters of a plurality of cells in a wireless network. The method 1500 may utilize a DRL method as described in co-pending application Ser. No. 15/643,266, previously incorporated by reference, to train a DRL neural network (DRL-NN) for selecting actions to adjust cell parameters of two cells (cell 1 and cell 2) associated with two base stations. The two cells are selected from the cells in the wireless network. At step 1502, the method 1500 determines whether the DRL-NN is initialized with randomly selected weight values, or with weight values of an expert supervised deep neural network (SDNN). The expert SDNN is a deep neural network that has been trained with expert supervising for wireless network optimization, or for adjusting similar cell parameters. The DRL method 1500 may determine to proceed to step 1504 to use random weight values to initialize the DRL-NN, or proceed to step 1506, where weight values of the expert SDNN are used to initialize the DRL-NN.

The method 1500 may then generate a plurality experience tuples for training the DRL-NN. Each experience tuple is represented by ($C_k$, $S_t$, $R_t$, $A_t$, $S_{t+1}$, $R_{t+1}$, Label). $C_k$ (k=1, 2) identifies the cell for which the experience tuple is generated, and the "Label" indicates whether the experience is a DRL-generated or expert-generated tuple. $S_t$, $R_t$, $S_{t+1}$, $A_t$, $R_{t+1}$ represents, respectively, a first state, a first reward associated with a previous action, a second state, an action that moves the cell from the first state to the second state, and a second reward associated with the action.

The two cells each have an initial state when the training begins. The state of a cell may be represented by a state tensor as discussed above with respect to FIGS. 6A-14. For example, the state of cell 1 or cell may be indicated by a 32×32×10 image-like 3D tensor, including information of the cell of interest (i.e., cell 1 or cell 2) and relationship information with 31 neighbor cells of the cell of interest. The 3D tensor includes 10 feature planes including information such as tilt, azimuth, cumulative distribution function (CDF) of RSRP or RSRQ, an interference matrix, ISD, etc. For the convenience of illustration, in this example, each cell state is represented by a state vector (tilt, azimuth, CDF of RSRP). The RSRP is obtained from MRs collected from the 32 cells within a time window, such as within an hour, 12 hours, or a day.

In this example, an action may be selected to adjust a tilt, an azimuth, a transmission power, or any combination thereof. The action may be represented by an action vector (tilt, azimuth, power). Each vector element represents a value for adjusting a cell parameter. An action may indicate a relative change or an absolute value for adjustment. In this example, an element value in the action vector indicates a target value that the corresponding parameter will be adjusted to. For example, a selected action (5, 15, N/A) indicates adjusting the tilt to 5°, azimuth to 15°, and not adjusting the transmission power. For each of cell 1 and cell 2, at step 1508, the method 1500 determines whether expert is used to select an action to adjust cell parameters of corresponding cells. Based on the determination at step 1508, the method 1500 may go to step 1510 generating DRL-generated experience tuples, or go to step 1512 generating expert-generated experience tuples. The method 1500 may select an action (tilt, azimuth, power), apply the selected action to the corresponding cell, update the cell's state, and calculate the reward, thereby generating an experience tuple. For example, the method 1500 may select an action (−5, +15, N/A) for cell 1 using the DRL-NN, and select an action (+5.2, N/A, N/A) for cell 2 according to an expert. The method 1500 adjusts parameters of cell 1 and cell 2 according to the selected actions, respectively, updates their states, i.e., generates updated state vectors, and calculates their corresponding rewards. In one example, the reward may be calculated using a cost function as discussed in co-pending application Ser. No. 15/643,266, previously incorporated by reference. In this example, the reward for each cell is calculated by $f_{cost}=(0.5*N1+0.5*N2)/N$, where N1 is the number of MRs received from UEs in the 32 cells whose RSRP of a serving cell is greater than or equal to a RSRP threshold, N2 is the number of MRs received from the UEs in the 32 cells whose RSRQ of a serving cell is greater than or equal to a RSRQ threshold, and N is the total number of MRs received from the UEs in the 32 cells. The reward indicates whether an action for a cell is on the right track to adjust the setting of a base station providing a coverage area of the cell for improving the performance of the wireless network.

At step 1514, the method 1500 determines whether it needs to generate more experience tuples. The method 1500 may select a sequence of actions for cell 1 and cell 2, and generate a plurality of experience tuples for each of the two cells. The method 1500 may go back to step 1508 to generate more experience tuples. When an experience is generated, it will be saved in the experience pool for future retrieving. When no more experience tuples are needed, the method 1500 may retrieve a mini batch of experience tuples from the experience pool. At step 1516, the method 1500 determines whether DRL-generated or expert-generated experience tuples are selected for the mini batch. When determining to use a DRL-generated experience tuple, at step 1518, the method 1500 retrieves a DRL-generated experience tuple ($C_k$, $S_t$, $R_t$, $A_t$, $S_{t+1}$, $R_{t+1}$, DRL) from the experience pool. When determining to use an expert-generated experience tuple, at step 1520, the method 1500 retrieves an expert-generated experience tuple ($C_k$, $S_t$, $R_t$, $A_t$, $S_{t+1}$, $R_{t+1}$, Expert) from experience pool. When the method 1500 determines, at step 1522, that the mini batch needs more experience tuples, it goes back to step 1516 to continue select more experience tuples for the mini batch from experience pool; Otherwise, it goes to step 1524. At step 1524, the method 1500 calculates a TD error corresponding to each action of the experience tuples in the mini batch using a loss function. For example, the TD error may be calculated for minimizing MSE loss by stochastic gradient descent. At step 1526, the method 1500 back-propagates gradients calculated according to the TD errors to update weights of the DRL-NN. At step 1528, the method 1500 determines whether the DRL-NN needs more training. The method 1500 may go to step 1530 and stop the training, or go to step 1508 to perform further training.

Figure 16:
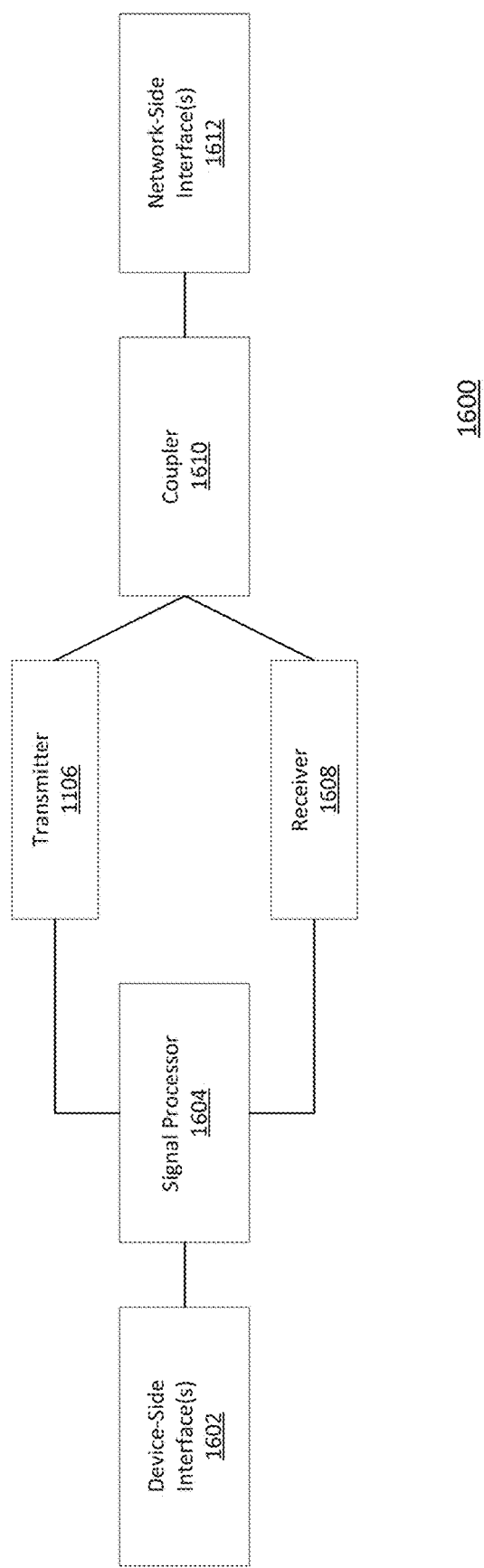
FIG. 16 is a block diagram of a wireless transceiver which may be used to implement aspects of the present technology.

FIG. 16 illustrates a block diagram of a transceiver 1600 adapted to transmit and receive signaling over a cellular network 100 (FIG. 1). One or more transceivers 1600 may be implemented in base stations 110. The transceivers 1600 may be configured for optimizing cell specific antenna configuration parameters, as described in the embodiments herein. As shown, the transceiver 1600 comprises a network-side interface 1602, a coupler 1604, a transmitter 1606, a receiver 1608, a signal processor 1610, and a device side interface 1612. The network-side interface 1602 may include any component, circuitry, or combination thereof adapted to transmit or receive signaling over a cellular network 100 (FIG. 1). The coupler 1604 may include any component or collection of components adapted to facilitate bi-directional communication over the network-side interface 1602. The transmitter 1606 may include any component or collection of components (e.g., band signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., UE devices 120 (FIG. 1), local area network (LAN) ports, etc.).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 17:
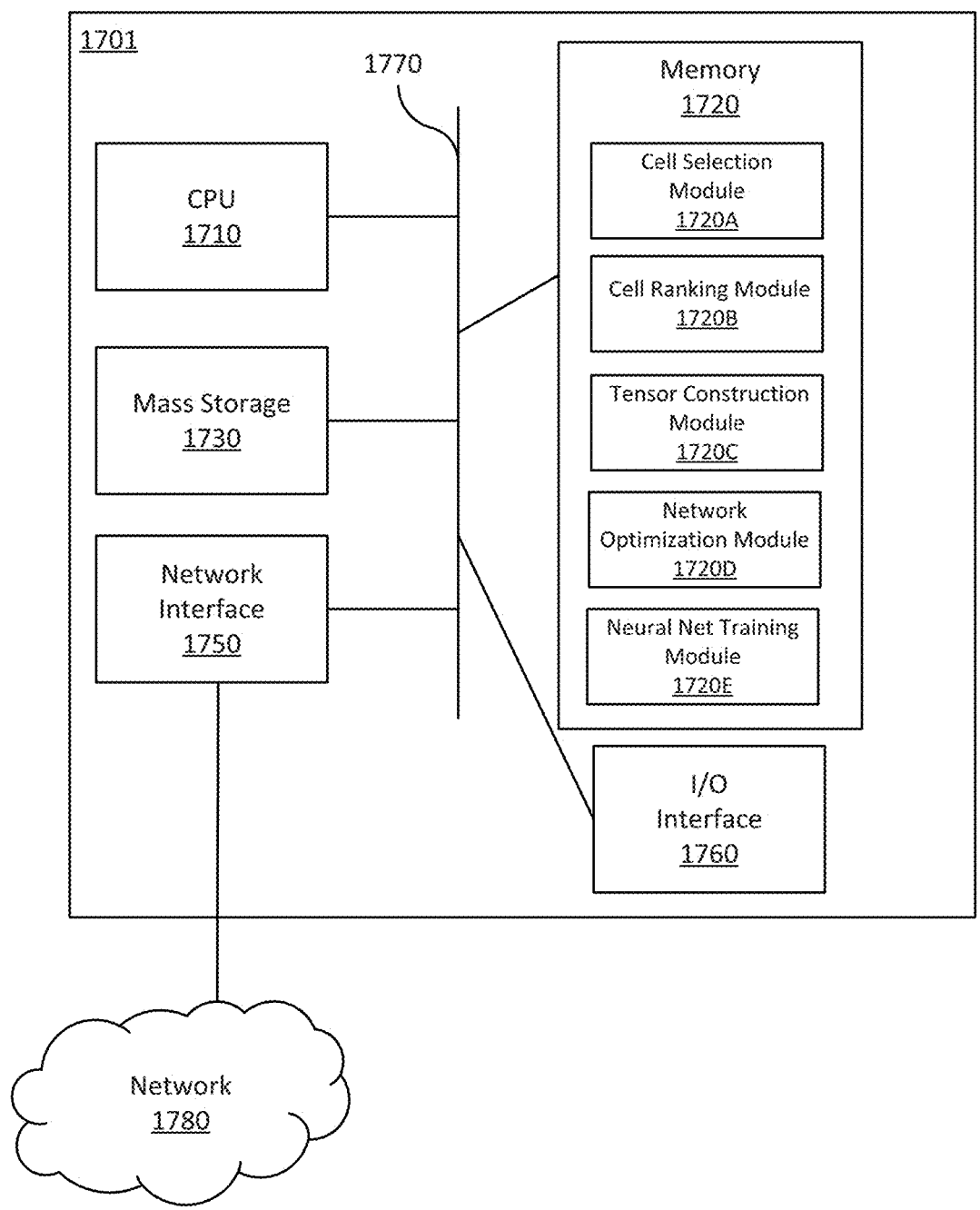
FIG. 17 is a block diagram of a computing environment which may be used to implement aspects of the present technology.

FIG. 17 is a block diagram of a network device 1700 that can be used to implement various embodiments. Specific network devices may utilize all of the components shown, or only a subset of the components, and levels of integration may vary from device to device. Furthermore, the network device 1700 may contain multiple instances of a component, such as multiple processing units, processors, memories, transmitters, receivers, etc. The network device 1700 may comprise a processing unit 1701 equipped with one or more input/output devices, such as network interfaces, storage interfaces, and the like. The processing unit 1701 may include a central processing unit (CPU) 1710, a memory 1720, a mass storage device 1730, and an I/O interface 1760 connected to a bus 1770. The bus 1770 may be one or more of any type of several bus architectures including a memory bus or memory controller, a peripheral bus or the like.

The CPU 1710 may comprise any type of electronic data processor. The memory 1720 may comprise any type of system memory such as static random access memory (SRAM), dynamic random access memory (DRAM), synchronous DRAM (SDRAM), read-only memory (ROM), a combination thereof, or the like. In an embodiment, the memory 1720 may include ROM for use at boot-up, and DRAM for program and data storage for use while executing programs. In embodiments, the memory 1720 is non-transitory. In one embodiment, the memory 1720 includes a cell selection module 1720A that identifies underperforming cells, generates groups of cells, selects groups of cells to be optimized and selects cells within each group of cells to be optimized, a cell ranking module 1720B that ranks the selected cell's neighboring cells according to the strength of their relationship with the selected cell, a tensor construction module 1720C that extracts multi-channel information about the relationships between pairs of neighboring cells and constructs a multi-dimensional state tensor based on the ranking of neighboring cells and the multi-channel information about the relationships between pairs of neighboring cells, a network optimization module 1720D that feeds the multi-dimensional state tensor into a deep neural network as input data and uses the deep neural network to generate and apply a solution for optimizing a cellular network, and a neural network training module 1720E that records the solutions generated by the network optimization module 1720D and performance measures of the cellular network based on applying the solutions to the cellular network and updates the deep neural network based on the recorded information.

The mass storage device 1730 may comprise any type of storage device configured to store data, programs, and other information and to make the data, programs, and other information accessible via the bus 1770. The mass storage device 1730 may comprise, for example, one or more of a solid state drive, hard disk drive, a magnetic disk drive, an optical disk drive, or the like.

The processing unit 1701 also includes one or more network interfaces 1750, which may comprise wired links, such as an Ethernet cable or the like, and/or wireless links to access nodes or one or more networks 1780. The network interface 1750 allows the processing unit 1701 to communicate with remote units via the networks 1780. For example, the network interface 1750 may provide wireless communication via one or more transmitters/transmit antennas and one or more receivers/receive antennas. In an embodiment, the processing unit 1701 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Additional aspects may be realized from the following examples.

Example 1

A computer-implemented method for optimizing a cellular network having a plurality of cells, comprising: selecting a group of cells comprising a cell identified as underperforming and one or more neighboring cells; ranking the one or more neighboring cells based on one or more relationship parameters between the underperforming cell and the one or more neighboring cells; generating a state tensor for the group of cells based on the ranking of the one or more neighboring cells, the state tensor reflecting operational communication conditions within the group of cells in the cellular network; processing the state tensor to produce one or more recommendations for adjusting one or more parameters of the cellular network; and adjusting the one or more parameters of the cellular network based on the one or more recommendations.

Example 2

The computer-implemented method of example 1, wherein processing the state tensor to produce one or more recommendations for adjusting one or more parameters of the cellular network comprises: submitting the state tensor as input into a deep neural network; and producing one or more recommendations, using the deep neural network, for adjusting one or more parameters of the cellular network.

Example 3

The computer-implemented method of any of examples 1-2, wherein the cell is identified as underperforming when one or more cell performance measurements exceed one or more thresholds.

Example 4

The computer-implemented method of any of examples 1-3, wherein the one or more cell performance measurements comprise an objective function value that is calculated based on a relationship between signal power and signal quality.

Example 5

The computer-implemented method of any of examples 1-4, wherein the one or more relationship parameters comprise an interference level between the underperforming cell and the one or more neighboring cells.

Example 6

The computer-implemented method of any of examples 1-5, wherein the interference level is a value that is averaged over a period of time.

Example 7

The computer-implemented method of any of examples 1-6, wherein the generating a state tensor for the group of cells based on the ranking of the one or more neighboring cells comprises: selecting a size for a base grid; constructing the base grid of the selected size, wherein cells in the group of cells are placed in a position on both a horizontal axis and a vertical axis of the base grid; extracting multiple channels of information for one or more pairs of cells, each of the one or more pairs of cells comprising a cell from the horizontal axis and a cell from the vertical axis in the base grid; and constructing the state tensor based on the base grid and the extracted multiple channels of information.

Example 8

The computer-implemented method of any of examples 1-7, wherein the constructing a base grid comprises: placing the underperforming cell in the base grid at the center of the horizontal axis and the vertical axis; and arranging the one or more neighboring cells in the base grid such that higher ranking neighboring cells are placed closer to the underperforming cell on the horizontal axis and the vertical axis.

Example 9

The computer-implemented method of any of examples 1-8, wherein the deep neural network is a convolutional neural network.

Example 10

The computer-implemented method of any of examples 1-9, wherein the producing one or more recommendations, using the deep neural network, for adjusting one or more parameters of the cellular network comprises: applying the solution to the cellular network; and determining whether to accept the one or more recommendations based on an impact of the one or more recommendations on the cellular network, wherein the impact is measured by a change in the overall coverage and capacity of the cellular network.

Example 11

The computer-implemented method of any of examples 1-10, further comprising: rejecting the one or more recommendations in response to determining that the impact of the one or more recommendations negatively affect the overall coverage and capacity of the cellular network; accepting the one or more recommendations in response to determining that the impact of the one or more recommendations positively affect the overall coverage and capacity of the cellular network; and updating the deep neural network based on whether the one or more recommendations were accepted.

Example 12

The computer-implemented method of any of examples 1-11, wherein the group of cells and one or more additional groups of cells are each assigned a priority.

Example 13

The computer-implemented method of any of examples 1-12, wherein the priorities of the group of cells and one or more additional group of cells is calculated based on one or more of the severity, preference, weight, and neighbor relationships associated with the underperforming cell in the group of cells.

Example 14

The computer-implemented method of any of examples 1-13, wherein the group of cells and the one or more additional groups of cells are optimized in an order of a highest to a lowest priority.

Example 15

The computer-implemented method of any of examples 1-14, wherein the group of cells and at least one of the one or more additional groups of cells having the highest priority are optimized in parallel.

Example 16

A cellular network optimization device, comprising: a non-transitory memory storage comprising instructions; and one or more processors in communication with the memory, wherein the one or more processors are configured to execute the instructions to: select a group of cells comprising a cell identified as underperforming and one or more neighboring cells; rank the one or more neighboring cells based on one or more relationship parameters between the underperforming cell and the one or more neighboring cells; generate a state tensor for the group of cells based on the ranking of the one or more neighboring cells, the state tensor reflecting operational communication conditions within the group of cells in the cellular network; process the state tensor to produce one or more recommendations for adjusting one or more parameters of the cellular network; and adjust the one or more parameters of the cellular network based on the one or more recommendations.

Example 17

The cellular network optimization device of example 16 wherein the one or more processors are further configured to execute the instructions to: submit the state tensor as input into a deep neural network; and produce one or more recommendations, using the deep neural network, for adjusting one or more parameters of the cellular network.

Example 18

The cellular network optimization device of any of examples 16-17, wherein the step to generate a state tensor for the group of cells based on the ranking of the one or more neighboring cells comprises: select a size for a base grid; construct the base grid of the selected size, wherein cells in the group of cells are placed in a position on both a horizontal axis and a vertical axis of the base grid; extract multiple channels of information for one or more pairs of cells, each of the one or more pairs of cells comprising a cell from the horizontal axis and a cell from the vertical axis in the base grid; and construct the state tensor based on the base grid and the extracted multiple channels of information.

Example 19

The cellular network optimization device of any of examples 16-18, wherein the construct a base grid comprises: place the underperforming cell in the base grid at the center of the horizontal axis and the vertical axis; and arrange the one or more neighboring cells in the base grid such that higher ranking neighboring cells are placed closer to the underperforming cell on the horizontal axis and the vertical axis.

Example 20

A non-transitory computer-readable medium storing computer instructions for optimizing a cellular network having one or more cells that when executed by one or more processors, cause the one or more processors to perform the steps of: select a group of cells comprising a cell identified as underperforming and one or more neighboring cells; rank the one or more neighboring cells based on one or more relationship parameters between the underperforming cell and the one or more neighboring cells; generate a state tensor for the group of cells based on the ranking of the one or more neighboring cells, the state tensor reflecting operational communication conditions within the group of cells in the cellular network; process the state tensor to produce one or more recommendations for adjusting one or more parameters of the cellular network; and adjust the one or more parameters of the cellular network based on the one or more recommendations.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated, For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for optimizing a cellular network having a plurality of cells, comprising:
   selecting a group of cells comprising a cell identified as underperforming and one or more neighboring cells;
   ranking the one or more neighboring cells based on one or more relationship parameters between the underperforming cell and the one or more neighboring cells;
   generating a state tensor for the group of cells based on the ranking of the one or more neighboring cells, the state tensor reflecting operational communication conditions within the group of cells in the cellular network;
   processing the state tensor to produce one or more recommendations for adjusting one or more parameters of the cellular network; and
   adjusting the one or more parameters of the cellular network based on the one or more recommendations.

2. The computer-implemented method of claim 1, wherein processing the state tensor to produce one or more recommendations for adjusting one or more parameters of the cellular network comprises:
   submitting the state tensor as input into a deep neural network; and
   producing one or more recommendations, using the deep neural network, for adjusting one or more parameters of the cellular network.

3. The computer-implemented method of claim 2, wherein the deep neural network is a convolutional neural network.

4. The computer-implemented method of claim 2, wherein the producing one or more recommendations, using the deep neural network, for adjusting one or more parameters of the cellular network comprises:
   applying the solution to the cellular network; and
   determining whether to accept the one or more recommendations based on an impact of the one or more recommendations on the cellular network, wherein the impact is measured by a change in the overall coverage and capacity of the cellular network.

5. The computer-implemented method of claim 4, further comprising:
   rejecting the one or more recommendations in response to determining that the impact of the one or more recommendations negatively affect the overall coverage and capacity of the cellular network;
   accepting the one or more recommendations in response to determining that the impact of the one or more recommendations positively affect the overall coverage and capacity of the cellular network; and
   updating the deep neural network based on whether the one or more recommendations were accepted.

6. The computer-implemented method of claim 1, wherein the cell is identified as underperforming when one or more cell performance measurements exceed one or more thresholds.

7. The computer-implemented method of claim 6, wherein the one or more cell performance measurements comprise an objective function value that is calculated based on a relationship between signal power and signal quality.

8. The computer-implemented method of claim 1, wherein the one or more relationship parameters comprise an interference level between the underperforming cell and the one or more neighboring cells.

9. The computer-implemented method of claim 8, wherein the interference level is a value that is averaged over a period of time.

10. The computer-implemented method of claim 1, wherein the generating a state tensor for the group of cells based on the ranking of the one or more neighboring cells comprises:
    selecting a size for a base grid;
    constructing the base grid of the selected size, wherein cells in the group of cells are placed in a position on both a horizontal axis and a vertical axis of the base grid;
    extracting multiple channels of information for one or more pairs of cells, each of the one or more pairs of cells comprising a cell from the horizontal axis and a cell from the vertical axis in the base grid; and
    constructing the state tensor based on the base grid and the extracted multiple channels of information.

11. The computer-implemented method of claim 10, wherein the constructing a base grid comprises:
    placing the underperforming cell in the base grid at the center of the horizontal axis and the vertical axis; and
    arranging the one or more neighboring cells in the base grid such that higher ranking neighboring cells are placed closer to the underperforming cell on the horizontal axis and the vertical axis.

12. The computer-implemented method of claim 1, wherein the group of cells and one or more additional groups of cells are each assigned a priority.

13. The computer-implemented method of claim 12, wherein the priorities of the group of cells and one or more additional group of cells is calculated based on one or more of the severity, preference, weight, and neighbor relationships associated with the underperforming cell in the group of cells.

14. The computer-implemented method of claim 12, wherein the group of cells and the one or more additional groups of cells are optimized in an order of a highest to a lowest priority.

15. The computer-implemented method of claim 12, wherein the group of cells and at least one of the one or more additional groups of cells having the highest priority are optimized in parallel.

16. A cellular network optimization device, comprising:
    a non-transitory memory storage comprising instructions; and
    one or more processors in communication with the memory, wherein the one or more processors are configured to execute the instructions to:
        select a group of cells comprising a cell identified as underperforming and one or more neighboring cells;
        rank the one or more neighboring cells based on one or more relationship parameters between the underperforming cell and the one or more neighboring cells;
        generate a state tensor for the group of cells based on the ranking of the one or more neighboring cells, the state tensor reflecting operational communication conditions within the group of cells in the cellular network;
        process the state tensor to produce one or more recommendations for adjusting one or more parameters of the cellular network; and
        adjust the one or more parameters of the cellular network based on the one or more recommendations.

17. The cellular network optimization device of claim 16 wherein the one or more processors are further configured to execute the instructions to:
    submit the state tensor as input into a deep neural network; and produce one or more recommendations, using the deep neural network, for adjusting one or more parameters of the cellular network.

18. The cellular network optimization device of claim 16, wherein the step to generate a state tensor for the group of cells based on the ranking of the one or more neighboring cells comprises:

select a size for a base grid;

construct the base grid of the selected size, wherein cells in the group of cells are placed in a position on both a horizontal axis and a vertical axis of the base grid;

extract multiple channels of information for one or more pairs of cells, each of the one or more pairs of cells comprising a cell from the horizontal axis and a cell from the vertical axis in the base grid; and construct the state tensor based on the base grid and the extracted multiple channels of information.

19. The cellular network optimization device of claim 18, wherein the construct a base grid comprises:

place the underperforming cell in the base grid at the center of the horizontal axis and the vertical axis; and arrange the one or more neighboring cells in the base grid such that higher ranking neighboring cells are placed closer to the underperforming cell on the horizontal axis and the vertical axis.

20. A non-transitory computer-readable medium storing computer instructions for optimizing a cellular network having one or more cells that when executed by one or more processors, cause the one or more processors to perform the steps of:

select a group of cells comprising a cell identified as underperforming and one or more neighboring cells;

rank the one or more neighboring cells based on one or more relationship parameters between the underperforming cell and the one or more neighboring cells;

generate a state tensor for the group of cells based on the ranking of the one or more neighboring cells, the state tensor reflecting operational communication conditions within the group of cells in the cellular network;

process the state tensor to produce one or more recommendations for adjusting one or more parameters of the cellular network; and adjust the one or more parameters of the cellular network based on the one or more recommendations.

* * * * *